United States Patent
Matsuoka et al.

(10) Patent No.: US 9,865,307 B2
(45) Date of Patent: Jan. 9, 2018

(54) RECORDING DEVICE, RECORDING METHOD, AND NON-TRANSITORY RECORDING MEDIUM

(71) Applicant: JVC KENWOOD Corporation, Yokohama-shi, Kanagawa (JP)

(72) Inventors: Kenji Matsuoka, Yokohama (JP); Jiro Uzaki, Yokohama (JP); Mizuki Ohara, Yokohama (JP); Hideaki Onoda, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 15/176,095

(22) Filed: Jun. 7, 2016

(65) Prior Publication Data

US 2016/0365125 A1 Dec. 15, 2016

(30) Foreign Application Priority Data

Jun. 12, 2015 (JP) ................ 2015-118861

(51) Int. Cl.
| | |
|---|---|
| *H04N 9/80* | (2006.01) |
| *G11B 27/19* | (2006.01) |
| *G11B 27/034* | (2006.01) |
| *H04N 5/765* | (2006.01) |

(52) U.S. Cl.
CPC ............ *G11B 27/19* (2013.01); *G11B 27/034* (2013.01); *H04N 5/765* (2013.01)

(58) Field of Classification Search
CPC ..... G11B 27/005; G11B 27/19; G11B 27/034; G11B 27/28; H04N 5/93; H04N 5/783; H04N 5/765

USPC .......................................... 386/248
See application file for complete search history.

(56) References Cited

U.S. PATENT DOCUMENTS

| | | | | |
|---|---|---|---|---|
| 6,525,801 | B1* | 2/2003 | Matsuzawa | H04N 7/148 348/14.12 |
| 2002/0015582 | A1* | 2/2002 | Matsumoto | H04N 5/76 386/295 |
| 2003/0074130 | A1* | 4/2003 | Negishi | G01C 21/3647 701/431 |
| 2008/0068499 | A1* | 3/2008 | Mizuno | H04N 7/0112 348/448 |
| 2008/0133638 | A1* | 6/2008 | Fischer | G06Q 50/01 709/201 |

(Continued)

FOREIGN PATENT DOCUMENTS

JP H10174056 6/1998

*Primary Examiner* — William Tran
(74) *Attorney, Agent, or Firm* — Procopio, Cory, Hargreaves & Savitch LLP

(57) ABSTRACT

A recording device includes an imaging unit that takes a video, a recording time conversion processor that converts a frame rate of specified video data in the video so as to adjust the video to fall within a specified recording time, and a tag range processor that sets a tag range where a tag can be assigned in accordance with a level of importance to the video data, and the recording time conversion processor converts a frame rate at a first thinning-out rate that thins out a frame in a first video data range where the tag range is not set in the video data, and converts a frame rate at a second thinning-out rate that thins out a frame in a second video data range where the tag range is set in the video data in accordance with the level of importance.

6 Claims, 19 Drawing Sheets

(56) References Cited

U.S. PATENT DOCUMENTS

2011/0161168 A1\* 6/2011 Dubnicki .......... G06F 17/30707
705/14.49

\* cited by examiner

| SCENE NO. | 1 | 2 | 3 | 4 | 5 | 6 | 7 | 8 | 9 | 10 | 11 | 12 |
|---|---|---|---|---|---|---|---|---|---|---|---|---|
| SCENE IMAGING TIME | 6 | 18 | 9 | 12 | 3 | 9 | 12 | 9 | 15 | 3 | 12 | 12 |
| TAG | * | | * | | * | | | * | | | | |
| LEVEL OF IMPORTANCE | 1 | | 3 | | 2 | | | 4 | | | | |
| PRE-RECORDING TIME | 6 | 4.5 | 9 | 3 | 3 | 2.25 | 3 | 9 | 3.75 | 0.75 | 3 | 3 |
| THINNING-OUT RATE | 1 | 4.65 | 1.125 | 4.65 | 1 | 4.65 | 4.65 | 1.125 | 4.65 | 4.7 | 4.65 | 4.65 |
| FINAL RECORDING TIME | 6 | 0.9 | 8 | 0.6 | 3 | 0.4 | 0.6 | 8 | 0.8 | 0.2 | 0.6 | 0.6 |

Fig. 5

| SCENE NO. | 1 | 2 | 3 | 4 | 5 | 6 | 7 | 8 | 9 | 10 | 11 | 12 |
|---|---|---|---|---|---|---|---|---|---|---|---|---|
| SCENE IMAGING TIME | 6 | 18 | 9 | 12 | 3 | 9 | 12 | 9 | 15 | 3 | 12 | 12 |
| TAG | * | * | | * | | * | | | | | | |
| LEVEL OF IMPORTANCE | 2 | 1 | | 4 | | 3 | | | | | | |
| PRE-RECORDING TIME | 6 | 18 | 2.25 | 12 | 0.8 | 9 | 3 | 2.25 | 3.75 | 0.8 | 3 | 3 |
| THINNING-OUT RATE | 2.7 | 1 | 3.75 | 2.7 | 3.8 | 2.7 | 3.75 | 3.75 | 3.75 | 3.8 | 3.75 | 3.75 |
| FINAL RECORDING TIME | 2.2 | 18 | 0.6 | 4.4 | 0.2 | 3.3 | 0.8 | 0.6 | 1 | 0.2 | 0.8 | 0.8 |

Fig. 7

| SCENE NO. | 1 | 2 | 3 | 4 | 5 | 6 | 7 | 8 | 9 | 10 | 11 | 12 |
|---|---|---|---|---|---|---|---|---|---|---|---|---|
| SCENE IMAGING TIME | 6 | 18 | 9 | 12 | 3 | 9 | 12 | 9 | 15 | 3 | 12 | 12 |
| TAG | * | | | | * | | | | | * | | |
| LEVEL OF IMPORTANCE | 2 | | | | 1 | | | | | 3 | | |
| PRE-RECORDING TIME | 6 | 4.5 | 2.25 | 3 | 3 | 2.25 | 3 | 2.25 | 3.75 | 3 | 3 | 3 |
| THINNING-OUT RATE | 1 | 1.5 | 1.5 | 1.5 | 1 | 1.5 | 1.5 | 1.5 | 1.5 | 1 | 1.5 | 1.5 |
| FINAL RECORDING TIME | 6 | 3 | 1.5 | 2 | 3 | 1.5 | 2 | 1.5 | 2.5 | 3 | 2 | 2 |

Fig. 9

| SCENE NO. | 1 | 2 | 3 | 4 | 5 | 6 | 7 | 8 | 9 | 10 | 11 | 12 |
|---|---|---|---|---|---|---|---|---|---|---|---|---|
| SCENE IMAGING TIME | 6 | 18 | 9 | 12 | 3 | 9 | 12 | 9 | 15 | 3 | 12 | 12 |
| TAG | * | | * | | * | | | | | * | | |
| LEVEL OF IMPORTANCE | 2 | | 4 | | 1 | | | | | 3 | | |
| PRE-RECORDING TIME | 6 | 4.5 | 9 | 3 | 3 | 2.25 | 3 | 2.25 | 3.75 | 3 | 3 | 3 |
| THINNING-OUT RATE | 1 | 2.75 | 1 | 2.75 | 1 | 2.75 | 2.75 | 2.75 | 2.75 | 1 | 2.75 | 2.75 |
| FINAL RECORDING TIME | 6 | 1.6 | 9 | 1.1 | 3 | 0.8 | 1.1 | 0.8 | 1.4 | 3 | 1.1 | 1.1 |

Fig. 11

| SCENE NO. | 1 | 2 | 3 | 4 | 5 | 6 | 7 | 8 | 9 | 10 | 11 | 12 |
|---|---|---|---|---|---|---|---|---|---|---|---|---|
| SCENE IMAGING TIME | 6 | 18 | 9 | 12 | 3 | 9 | 12 | 9 | 15 | 3 | 12 | 12 |
| TAG | * | * | * | * | * | * | * |   | * | * |   | * |
| LEVEL OF IMPORTANCE | 2 | 8 | 4 | 10 | 1 | 9 | 7 |   | 5 | 3 |   | 6 |
| PRE-RECORDING TIME | 6 | 18 | 9 | 12 | 3 | 9 | 12 | 2.25 | 15 | 3 | 12 | 12 |
| THINNING-OUT RATE | 1 | 6 | 6 | 6 | 1 | 6 | 6 | 1.5 | 6 | 1 | 1.5 | 1.5 |
| FINAL RECORDING TIME | 6 | 3 | 1.5 | 2 | 3 | 1.5 | 2 | 1.5 | 2.5 | 3 | 2 | 2 |

Fig. 13

| SCENE NO. | 1 | 2 | 3 | 4 | 5 | 6 | 7 | 8 | 9 | 10 | 11 | 12 |
|---|---|---|---|---|---|---|---|---|---|---|---|---|
| SCENE IMAGING TIME | 6 | 18 | 9 | 12 | 3 | 9 | 12 | 9 | 15 | 3 | 12 | 12 |
| TAG | * | * | * | * | * | * | * | * | * | * | * | * |
| LEVEL OF IMPORTANCE | 2 | 8 | 4 | 10 | 1 | 9 | 7 | 11 | 5 | 3 | 12 | 6 |
| PRE-RECORDING TIME | 6 | 18 | 9 | 12 | 3 | 9 | 12 | 9 | 15 | 3 | 12 | 12 |
| THINNING-OUT RATE | 1 | 6 | 6 | 6 | 1 | 6 | 6 | 1.5 | 6 | 1 | 1.5 | 1.5 |
| FINAL RECORDING TIME | 6 | 3 | 1.5 | 2 | 3 | 1.5 | 2 | 1.5 | 2.5 | 3 | 2 | 2 |

Fig. 15

RECORDING DEVICE, RECORDING METHOD, AND NON-TRANSITORY RECORDING MEDIUM

CROSS REFERENCE TO RELATED APPLICATION

This application is based upon and claims the benefit of priority from Japanese patent application No. 2015-118861, filed on Jun. 12, 2015, the disclosure of which is incorporated herein in its entirety by reference.

BACKGROUND

The present invention relates to a recording device, a recording method and a non-transitory program and, particularly, relates to a recording device, a recording method and a non-transitory program for recording a video.

In a method of playing back video data taken with a digital camera or a digital video recorder, viewing time is reduced by playing back the video data at a higher speed than normal.

For example, a recording and playback device that records a video at a normal frame rate and, when playing back, detects a scene where the motion of an object or a human appears in the video content and plays back the scene at normal playback speed, and fast-forwards the other scenes is disclosed in Japanese Unexamined Patent Publication No. H10-174056.

SUMMARY

However, the playback device disclosed in Japanese Unexamined Patent Publication No. H10-174056 has a problem that the size of recorded data is large because a scene which is played back at normal speed and a scene which is played back in fast-forward are recorded at the same frame rate.

A recording device according to an embodiment includes an imaging unit that takes a video, a recording time conversion processor that converts a frame rate of specified video data in the video so as to adjust the video to fall within a specified recording time, and a tag range processor that sets a tag range where a tag can be assigned in accordance with a level of importance to the video data, wherein the recording time conversion processor converts a frame rate at a first thinning-out rate that thins out a frame in a first video data range where the tag range is not set in the video data, and converts a frame rate at a second thinning-out rate that thins out a frame in a second video data range where the tag range is set in the video data in accordance with the level of importance.

A recording method according to an embodiment is a recording method in a recording device including an imaging unit that takes a video, a recording time conversion processor that converts a frame rate of specified video data in the video so as to adjust the video to fall within a specified recording time, and a tag range processor that sets a tag range where a tag can be assigned in accordance with a level of importance to the video data, the method including a step of converting a frame rate at a first thinning-out rate that thins out a frame in a first video data range in the video data, and a step of converting a frame rate at a second thinning-out rate that thins out a frame in a second video data range in accordance with the level of importance.

A recording program according to an embodiment causes a computer to execute, in a recording device including an imaging unit that takes a video, a recording time conversion processor that converts a frame rate of specified video data in the video so as to adjust the video to fall within a specified recording time, and a tag range processor that sets a tag range where a tag can be assigned in accordance with a level of importance to the video data, a step of converting a frame rate at a first thinning-out rate that thins out a frame in a first video data range in the video data, and a step of converting a frame rate at a second thinning-out rate that thins out a frame in a second video data range in accordance with the level of importance.

BRIEF DESCRIPTION OF THE DRAWINGS

The above and other aspects, advantages and features will be more apparent from the following description of certain embodiments taken in conjunction with the accompanying drawings, in which:

FIG. 5 is a view showing the relationship of a scene number (No.), a recording time, a mark (*) indicating a scene where a tag is placed, the order of importance of a marked scene, a thinning-out rate and a recording time;

FIG. 7 is a view showing the relationship of a scene number (No.), a recording time, a mark (*) indicating a scene where a tag is placed, the order of importance of a marked scene, a thinning-out rate and a recording time;

FIG. 9 is a view showing the relationship of a scene number (No.), a recording time, a mark (*) indicating a scene where a tag is placed, the order of importance of a marked scene, a thinning-out rate and a recording time;

FIG. 11 is a view showing the relationship of a scene number (No.), a recording time, a mark (*) indicating a scene where a tag is placed, the order of importance of a marked scene, a thinning-out rate and a recording time;

FIG. 13 is a view showing the relationship of a scene number (No.), a recording time, a mark (*) indicating a scene where a tag is placed, the order of importance of a marked scene, a thinning-out rate and a recording time;

FIG. 15 is a view showing the relationship of a scene number (No.), a recording time, a mark (*) indicating a scene where a tag is placed, the order of importance of a marked scene, a thinning-out rate and a recording time;

DETAILED DESCRIPTION

Figure 1:
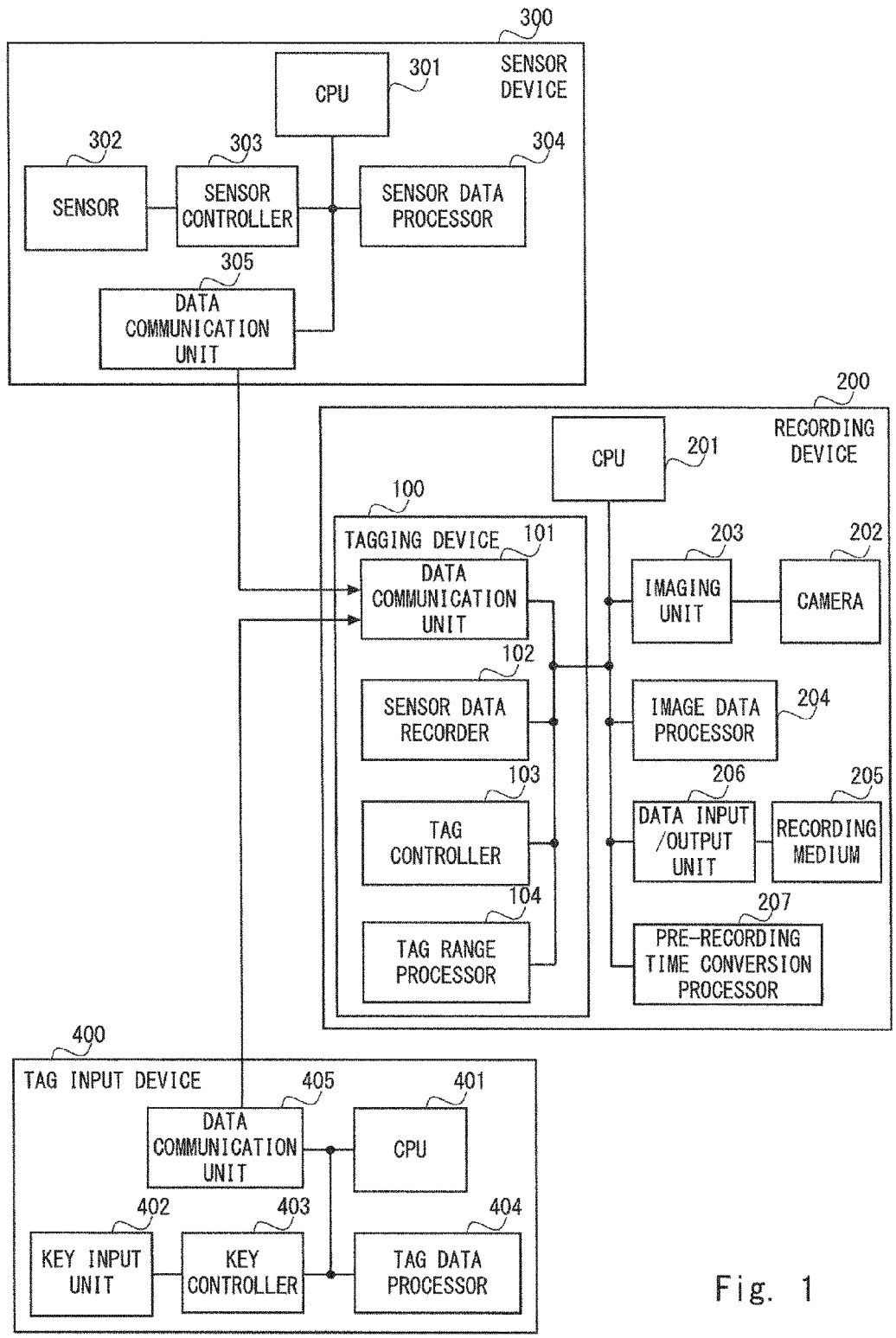
FIG. 1 is a block diagram showing the configuration of a recording device according to an embodiment.

An embodiment of the present invention is described hereinafter with reference to the drawings. FIG. 1 is a block diagram showing the configuration of a sensor device, a tag input device and recording device according to this embodiment;

In FIG. 1, a recording device 200 continuously takes images of a subject and acquires video data, a sensor device 300 continuously measures vital data of a person and transmits the data to the recording device 200, a tag input device 400 receives an instruction for placing a tag from a person and transmits the instruction for placing a tag to the recording device 200, and a tagging device 100 in the recording device 200 determines the timing to place a tag in the video data based on a change in vital data.

In FIG. 1, the video data taken by the recording device 200, the vital data measured by the sensor device 300 and the instruction for placing a tag received by the tag input device 400 are processed after being synchronized in time in the tagging device 100. When a delay is negligibly small in transmission of data between devices, those data may be processed in real time by the respective devices. Further, when taking a delay into consideration in transmission of data between devices, the data from each device may be transmitted in association with time, and the data at the same time may be processed in synchronization.

First, the tagging device 100 includes a data communication unit 101, a sensor data recorder 102, a tag controller 103, and a tag range processor 104.

The data communication unit 101 has the function of communicating with a data communication unit 305 of the sensor device 300 and a data communication unit 405 of the tag input device 400 by wired or wireless connections. To be specific, the data communication unit 101 receives the vital data transmitted from the data communication unit 305 of the sensor device 300 and also receives the tag input data transmitted from the data communication unit 405 of the tag input device 400.

When performing wireless communication, a wireless communication circuit that includes an antenna, an amplifier, a frequency converter, a modulator and a demodulator is suitable for use as the data communication unit 101. On the other hand, when performing wired communication, a wired communication circuit that includes an amplifier, a modulator and a demodulator is suitable for use as the data communication unit 101. Further, when performing optical communication, an optical communication circuit that includes a light emitting element, an optical modulator, a light receiving element and an optical demodulator is suitable for use as the data communication unit 101.

Particularly, the data communication unit 101 receives the vital data measured in the sensor device 300 and also receives the instruction for placing a tag transmitted from the tag input device 400 in parallel with receiving the vital data.

The sensor data recorder 102 records the data transmitted from the sensor device 300. For example, a memory such as RAM (Random Access Memory) is suitable for use as the sensor data recorder 102.

The tag controller 103 determines the timing to place a tag on video data based on a change in the vital data of at least one person. For example, the tag controller 103 sets the timing when the vital data reaches its peak as the timing to place a tag. Further, when there are a plurality of peaks in the vital data, the timing of the peak which is the closest to the timing of the instruction for placing a tag is set as the timing to place a tag.

Further, the tag controller 103 determines the timing to place a tag on video data in the range of the time where the vital data is equal to or more than a specified threshold and which includes the timing of an instruction for placing a tag based on a change in the vital data of at least one person.

Further, when the amount of a change in the vital data during an effective period is equal to or more than a specified threshold, the tag controller 103 determines the type of a tag to be placed based on the amount of a change in the vital data. Further, when the amount of a change in the vital data during an effective period is less than a specified threshold, the tag controller 103 determines the type of a tag to be placed based on the level of the vital data.

The tag range processor 104 determines the range of the time where a tag can be assigned as a tag range based on the vital data. For example, the tag range processor 104 sets the range of the time where the vital data is equal to or more than a specified threshold as the range where a tag can be assigned. To be specific, in the case of using a heart rate as the vital data, the range of time where the heart rate is equal to or more than a specified threshold (for example, a heart rate of 75) is set as the tag range.

The recording device 200 includes the tagging device 100, a CPU 201, a camera 202, an imaging unit 203, an image data processor 204, a recording medium 205, a data input/output unit 206, and a recording time conversion processor 207.

The CPU 201 is a central processing unit, and it connects with the data communication unit 101, the sensor data recorder 102, the tag controller 103, the tag range processor 104, the imaging unit 203, the image data processor 204 and the data input/output unit 206 through a data bus, and performs information processing by executing program instructions.

The camera 202 optically takes an image of an object, converts it into an electrical signal, and outputs the taken image data to the imaging unit 203. For example, a combination of a CCD (Charge-Coupled Device) image sensor or a CMOS (Complementary metal-oxide-semiconductor) image sensor and an optical lens is suitable for use as the camera 202.

The imaging unit 203 buffers the image data taken by the camera 202 and outputs it as video data at a specified frame rate. To be specific, the imaging unit 203 converts the image data taken by the camera 202 into successive image data at regular time intervals, which is a video data.

The image data processor 204 performs image processing on the video data output from the imaging unit 203 and stores the video data after image processing into the recording medium 205 through the data input/output unit 206. To be specific, the image data processor 204 converts the frame rate of the video data at a thinning-out rate specified by the CPU 201 or the recording time conversion processor 207. Further, the image data processor 204 may convert the video data into the image size specified by the CPU 201. Note that, when the video data output from the imaging unit 203 is stored in the recording medium 205 without image processing, the image data processor 204 may read the video data from the recording medium 205, perform image processing thereon, and store the processed video data into the recording medium 205.

The recording medium 205 is a medium for recording video data. For example, a nonvolatile memory such as a flash memory is suitable for use as the recording medium 205. Further, the recording medium 205 may be removable from the recording device 200.

The data input/output unit 206 stores data into the recording medium 205 or reads data from the recording medium 205. The data input/output unit 206 is suitably configured as an interface circuit with the recording medium 205, for example.

The recording time conversion processor 207 sets the thinning-out rate of video data based on tag data and information about the level of importance attached to the video data. The lowest value of the thinning-out rate is 1, and when the thinning-out rate is 1, no frame is thinned out, and when the thinning-out rate is more than 1, frames are thinned out to change the frame rate. For example, the recording time conversion processor 207 sets the thinning-out rate of video data for each scene based on tag data and information about the level of importance attached to the video data.

For example, the recording time conversion processor 207 converts the video data to a lower frame rate for a scene to which a tag is not assigned, and it does not convert the frame rate of the video data for a scene to which a tag is assigned, and after the end of imaging, further converts the frame rate of the video data after conversion for each scene so as to fall within a desired recording time. The scene is made up of the range of video data to which a tag range is not set or the range of video data to which a tag range is set.

Further, for example, the recording time conversion processor 207 sets a scene with a higher level of importance at a lower thinning-out rate and sets a scene with a lower level of importance at a higher thinning-out rate based on the level of importance of each scene. Further, for example, the recording time conversion processor 207 sets a scene with a higher level of importance at a thinning-out rate of 1 and sets a scene with a lower level of importance at a thinning-out rate which is higher than 1 and at which the entire video data can be recorded within a desired recording time.

Further, for video data where at least a video and a tag are combined for each scene, the recording time conversion processor 207 sets a scene to which a tag is assigned as a scene with a higher level of importance at a lower thinning-out rate and sets a scene to which a tag is not assigned as a scene with a lower level of importance at a higher thinning-out rate, for example.

Further, for video data where at least a video, a tag and the level of importance are combined for each scene, the recording time conversion processor 207 sets a scene with a higher level of importance to which a tag is assigned at a lower thinning-out rate, sets a scene with a lower level of importance to which a tag is assigned at a higher thinning-out rate, and sets a scene to which a tag is not assigned at a still higher thinning-out rate than the scene with a lower level of importance to which a tag is assigned.

The sensor device 300 includes a CPU 301, a sensor 302, a sensor controller 303, a sensor data processor 304, and a data communication unit 305. The sensor device 300 continuously measures vital data and continuously transmits the measured vital data to the tagging device 100 and the recording device 200.

The CPU 301 is a central processing unit, and it connects with the sensor 302, the sensor controller 303, the sensor data processor 304 and the data communication unit 305 through a data bus, and performs information processing by executing program instructions.

The sensor 302 measures a vital sign, converts the measured data into an electrical signal, and outputs it to the sensor controller 303. The vital sign to be measured is suitably any one or a combination of a heart rate, a respiration rate, a blood pressure, a body temperature and the oxygen saturation of arterial blood. Thus, the sensor 302 is suitably any one or a combination of a heart rate meter, a respirometer, a blood pressure meter, a thermometer and a pulse oximeter. Further, the sensor 302 may include an acceleration or may be combined with another sensor, using a subject's body motion as a vital sign. Further, the sensor 302 may use a sensor that measures a brain wave, a sweat rate and the like or may be combined with another sensor.

The sensor controller 303 controls the sensor 302, and amplifies, converts and outputs the measured data output from the sensor 302. For example, the sensor controller 303 is suitably composed of an amplifier, an analog-to-digital converter or the like.

The sensor data processor 304 buffers the measured data processed by the sensor controller 303, converts it into a specified format, and outputs the data to the data communication unit 305.

The data communication unit 305 transmits the measured data processed by the sensor data processor 304 to the data communication unit 101 by wireless or wired connections. A wireless communication circuit, a wired communication circuit or an optical communication circuit is suitable for use as the data communication unit 305, just like the data communication unit 101.

Note that, in the case of using a communication method where a delay is likely to occur between the sensor device 300 and the tagging device 100 and the recording device 200, the sensor data processor 304 may transmit the measured vital data and the time when the vital data is measured in combination.

The tag input device 400 includes a CPU 401, a key input unit 402, a key controller 403, a tag data processor 404, and a data communication unit 405.

The CPU 401 is a central processing unit, and it connects with the key controller 403, the tag data processor 404 and the data communication unit 405 through a data bus, and performs information processing by executing program instructions.

The key input unit 402 receives an input that is necessary for operating the tagging device 100 and the recording device 200. Particularly, the key input unit 402 receives the operation of placing a tag. For example, a switch or the like that connects electrical circuits by an operation such as pressing a button is suitable for use as the key input unit 402.

The key controller 403 performs various kinds of processing on a signal generated by the operation of the key input unit 402 and outputs the signal. For example, the key controller 402 performs processing such as the amplification of electrical signals and the removal of noise by chattering.

The tag data processor 404 determines whether the operation of the key input unit 402 output from the key controller 403 is the operation of placing a tag, and when it is the operation of placing a tag, transmits an instruction for placing a tag to the tagging device 100 in the recording device 200 through the data communication unit 405.

Note that, in the case of using a communication method where a delay is likely to occur between the tag input device 400 and the tagging device 100 and the recording device 200, the tag data processor 404 may transmit the time when the operation of placing a tag is received instead of the instruction for placing a tag. Further, the tag data processor 404 may transmit the instruction for placing a tag and the time when the operation of placing a tag is received in combination.

The data communication unit 405 transmits the operation of the key input unit 402 output from the key controller 403 and the instruction for placing a tag output from the tag data processor 404 to the data communication unit 101 by wireless or wired connections. A wireless communication circuit, a wired communication circuit or an optical communication circuit is suitable for use as the data communication unit 405, just like the data communication unit 101.

Figure 2:
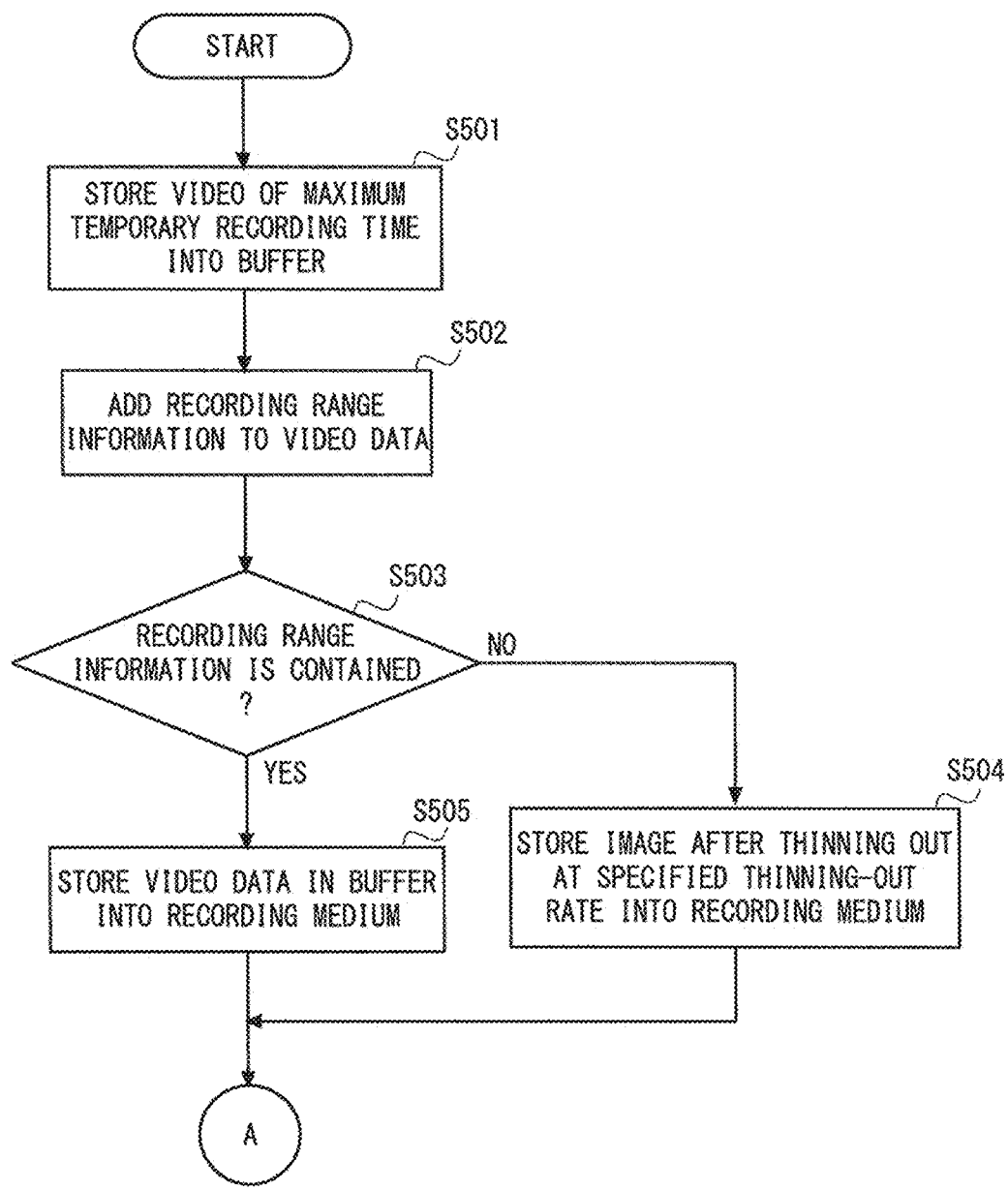
FIG. 2 is a flowchart showing an example of the operation of the recording device according to the embodiment.
Figure 3:
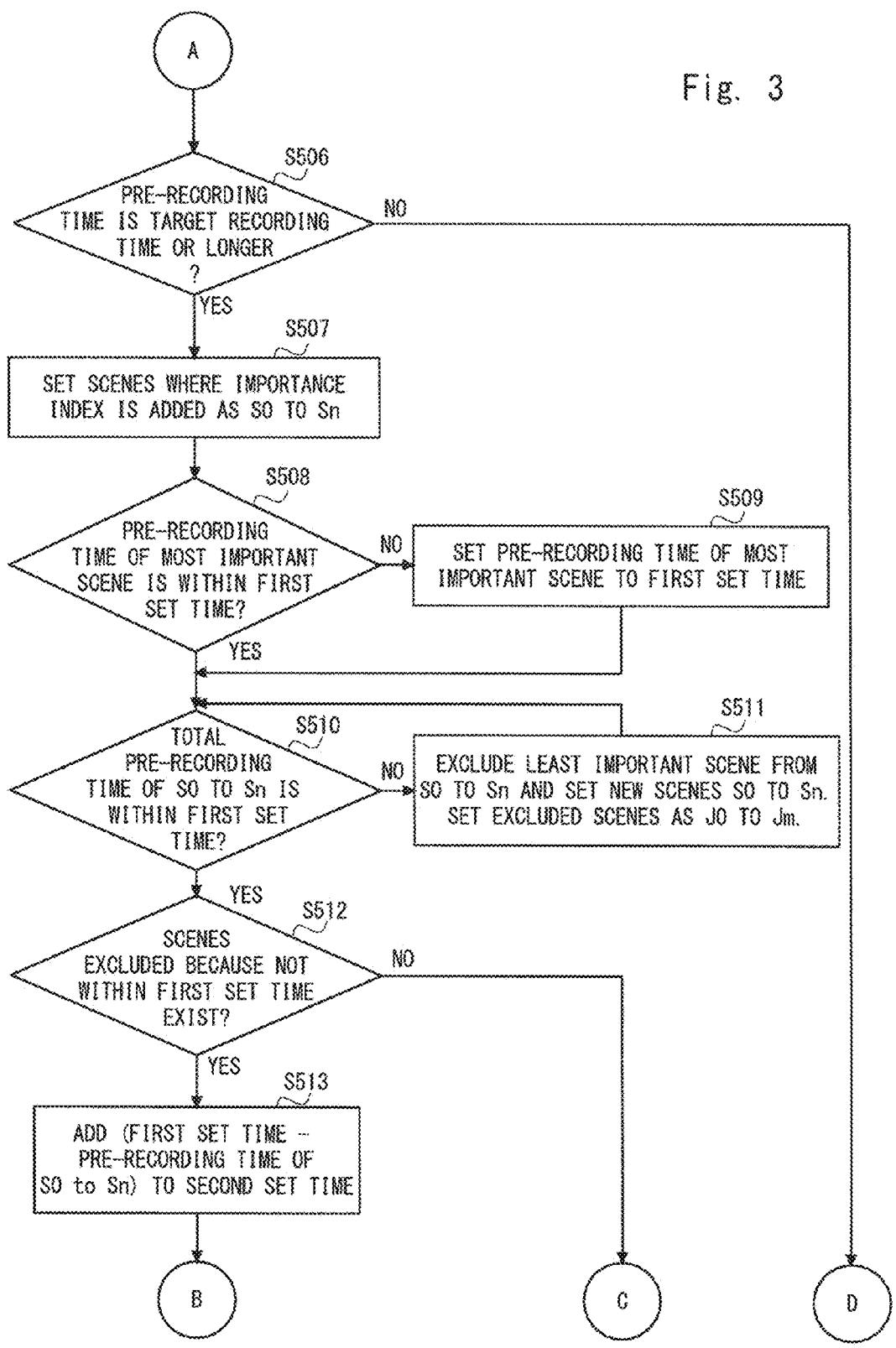
FIG. 3 is a flowchart showing an example of the operation of the recording device according to the embodiment.
Figure 4:
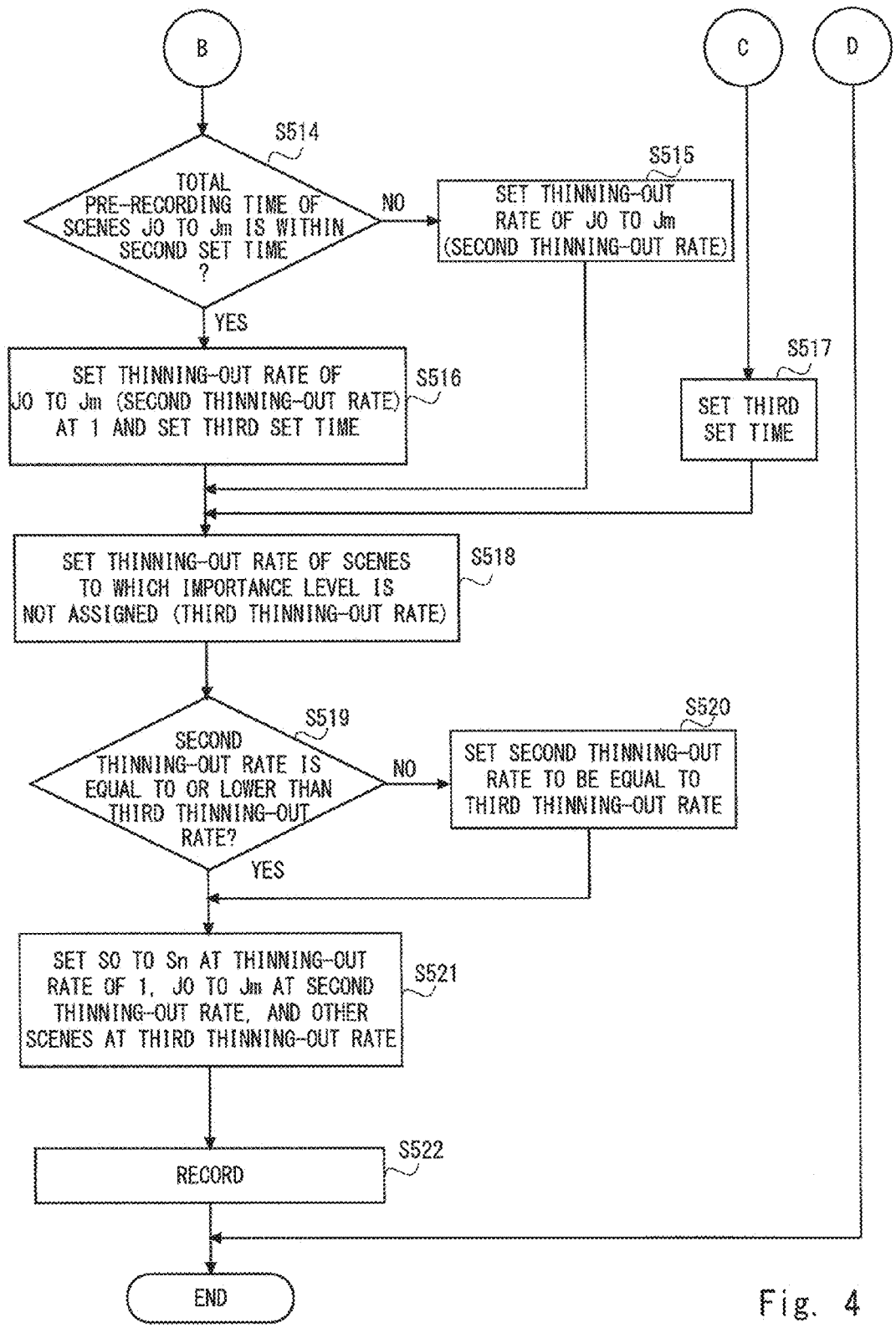
FIG. 4 is a flowchart showing an example of the operation of the recording device according to the embodiment.

The operation of the recording device 200 is described hereinafter. FIGS. 2, 3 and 4 are flowcharts showing an example of the operation of the recording device according to this embodiment.

First, in Step S501, video data of the maximum recording time that has been taken is stored into a buffer of the imaging unit 203, and the process proceeds to Step S502.

Next, in Step S502, the tag range processor 104 adds a scene tag and a tag range to the video data taken, and the process proceeds to Step S503.

In Step S503, the recording time conversion processor 207 determines whether a scene tag and a tag range are contained in the video data for each scene. When a scene tag and a tag range are contained in the video data, the process proceeds to Step S505, and when a scene tag and a tag range are not contained in the video data, the process proceeds to Step S504.

In Step S504, the recording time conversion processor 207 thins out the video data at a specified thinning-out rate for the scene where scene tag information and a tag range are not contained, stores the video data after thinning out into the recording medium 205, and the process proceeds to Step S506.

In Step S505, the video data in the buffer of the imaging unit 203 is stored into the recording medium 205, and the process proceeds to Step S506.

In Step S506, it is determined whether it is necessary to set the thinning-out rate of the video data to be recorded. Specifically, in Step S506, the recording time conversion processor 207 determines whether the total pre-recording time of the video data to be recorded is equal to or longer than a target recording time. When the total pre-recording time of the video data to be recorded is equal to or longer than the target recording time, it is necessary to change the thinning-out rate, and the process proceeds to Step S507. On the other hand, when the total pre-recording time of the video data to be recorded is shorter than the target recording time, it is not necessary to change the thinning-out rate, and the process ends.

Then, in Step S507, the recording time conversion processor 207 sets scenes to which information about the level of importance is assigned as important scenes S0 to Sn (n is an integer), and the process proceeds to Step S508.

In Step S508, the recording time conversion processor 207 determines whether the pre-recording time of the most important scene among the scenes S0 to Sn is equal to or less than a first set time. The first set time is a time for recording an important scene, and it is the final recording time for a scene that is recorded at a thinning-out rate of 1, for example. When the pre-recording time of the most important scene among the scenes S0 to Sn is equal to or shorter than the first set time, the process proceeds to Step S510. On the other hand, when the pre-recording time of the most important scene among the scenes S0 to Sn is longer than the first set time, the process proceeds to Step S509.

In Step S509, the recording time conversion processor 207 sets the pre-recording time of the most important scene as the first set time, and the process proceeds to Step S510. Specifically, the recording time conversion processor 207 changes the first set time from a preset value to the pre-recording time of the most important scene so that at least one most important scene can be recorded in the first set time.

In Steps S510 and S511, a scene that can be recorded at a thinning-out rate of 1 within the first set time is selected from the scenes to which tags are assigned.

To be specific, in Step S510, the recording time conversion processor 207 determines whether the total pre-recording time of the scenes S0 to Sn is within the first set time or not. When the total pre-recording time of the scenes S0 to Sn is equal to or shorter than the first set time, the process proceeds to Step S512, and when the total pre-recording time of the scenes S0 to Sn is longer than the first set time, the process proceeds to Step S511.

Then, in Step S511, the recording time conversion processor 207 excludes the least important scene among the scenes S0 to Sn, and sets the other scenes as new scenes S0 to Sn and sets the excluded scene as J0 to Jm (m is an integer), and then the process returns to Step S510. In other words, by the loop processing of Steps S510 and S511, scenes with low levels of importance are excluded so as to select the scenes S0 to Sn that are within the first set time. Note that the values n and m vary depending on the processing of excluding target scenes (specifically, n decreases and m increases).

In Step S512, the recording time conversion processor 207 determines whether there are the scenes J0 to Jm that have been excluded because they are not within the first set time. When the scenes J0 to Jm that have been excluded because they are not within the first set time exist, the process proceeds to Step S513, and when the scenes J0 to Jm that have been excluded because they are not within the first set time do not exist, the process proceeds to Step S517.

In Step S513, the recording time conversion processor 207 adds a value obtained by subtracting the pre-recording time of the scenes S0 to Sn from the first set time to a second set time, and the process proceeds to Step S514. In other words, in Step S513, the recording time conversion processor 207 adds a redundant time being a difference between the pre-recording time of the scenes S0 to Sn and the first set time to the second set time.

In Step S514, the recording time conversion processor 207 determines whether the total pre-recording time of the scenes J0 to Jm is within the second set time or not. When the total pre-recording time of the scenes J0 to Jm is equal to or shorter than the second set time, the process proceeds to Step S516, and when the total pre-recording time of the scenes J0 to Jm is longer than the second set time, the process proceeds to Step S515.

In Step S515, the recording time conversion processor 207 sets the thinning-out rate of the scenes J0 to Jm (second thinning-out rate) at which the scenes J0 to Jm can be recorded within the second set time, and the process proceeds to Step S518. To be specific, in Step S515, the thinning-out rate of the scenes J0 to Jm (second thinning-out rate) is obtained by dividing the total pre-recording time of the scenes J0 to Jm by the second set time.

In Step S516, the recording time conversion processor 207 sets the thinning-out rate of the scenes J0 to Jm (second thinning-out rate) at 1, and adds a value obtained by subtracting the pre-recording time of the scenes J0 to Jm from the second set time to a third set time, and the process proceeds to Step S518.

In Step S517, the recording time conversion processor 207 sets the third set time, and the process proceeds to Step S518. To be specific, in Step S517, a value obtained by adding the second set time to the first set time and then subtracting the total pre-recording time of the scenes S0 to Sn is added to the third set time.

In Step S518, the recording time conversion processor 207 sets the thinning-out rate of scenes to which the level of importance is not assigned (third thinning-out rate), and the process proceeds to Step S519. To be specific, in Step S518, the thinning-out rate of scenes to which the level of importance is not assigned (third thinning-out rate) is obtained by dividing the total pre-recording time of the scenes to which the level of importance is not assigned by the third set time. Note that, when there is no scene to which the level of importance is not assigned and there is no third thinning-out rate, the third thinning-out rate is set to 0.

In Step S519, it is checked whether the thinning-out rate of less important scenes (second thinning-out rate) is lower than the thinning-out rate of less important scenes with no tags (third total thinning-out rate). The third total thinning-out rate is the product of the pre-thinning-out rate and the third thinning-out rate obtained in Step S518, and it indicates the thinning-out rate when scenes to which tags are not assigned are recorded without thinning out in advance. Specifically, it is determined whether the less important scenes are recorded at a lower thinning-out rate (higher frame rate) than scenes with no tags. In Step S519, the recording time conversion processor 207 determines whether the second thinning-out rate is equal to or lower than the third total thinning-out rate. When the second thinning-out rate is equal to or lower than the third total thinning-out rate, the process proceeds to Step S521, and when the second thinning-out rate is higher than the third total thinning-out rate, the process proceeds to Step S520.

In Step S520, the recording time conversion processor 207 sets the second thinning-out rate to be equal to the third total thinning-out rate, and the process proceeds to Step S521. To be specific, in Step S520, the second thinning-out rate and the third total thinning-out rate are obtained by dividing, by the sum of the second set time and the third set time, the sum of the pre-recording time of the scenes J0 to Jm and the pre-recording time of the scenes with no tags multiplied by the pre-thinning-out rate, and the third thinning-out rate is obtained by eliminating the amount of the pre-thinning-out rate from it.

In Step S521, the recording time conversion processor 207 sets the scenes S0 to Sn at 1 (first thinning-out rate), the scenes J0 to Jm at the second thinning-out rate, and the other scenes at the third thinning-out rate, and then the process proceeds to Step S517.

In Step S522, the image data processor 204 converts each scene of the video data into data corresponding to the set thinning-out rate and records them in the recording medium 205 through the data input/output unit 206.

By the above operation, the recording device 200 can determine the thinning-out rate in consideration of the level of importance for each scene.

An example of determining the thinning-out rate by using the recording device 200 is described hereinafter.

There are two problems when making the recording time of a video to fall within a certain time while taking the video.

The first problem is that the imaging time is not fixed. For example, even in a game of sports with fixed duration such as football with two halves of 45 minutes, the period of time is extended for an additional time or the like. In sports such as baseball or tennis, the length of a game varies widely.

The second problem is that the order of importance of scenes where tags are placed cannot be determined until the end of imaging. Thus, in order to solve those problems, the imaging time is roughly estimated, and the recording processing is divided into stages in this embodiment.

Hereinafter, the case of setting the recording time of a recorded video of 120 minutes to fall within 30 minutes by changing the thinning-out rate in accordance with the level of importance is described as an example.

The embodiment uses the fact that, although the determination on the level of importance cannot be made until the end of imaging, it is possible to find whether there is a tag or not each time. Specifically, the process is broadly divided into two steps: the preceding "pre-recording" that thins out a scene where a tag is not placed at a predetermined thinning-out rate and the succeeding "main recording" that reduces the pre-recording time to within the target recording time after the end of imaging.

For example, the thinning-out rate of the pre-recording is set to 4 based on the assumption that, when a tag is not placed at all during a roughly estimated imaging time of 120 minutes, it is reduced to within 30 minutes.

In this embodiment, the operation that selects one from four successive video pictures and thereby reduces the recorded data size to ¼ is represented as thinning out at a thinning-out rate of 4. In the case where tags are placed on all scenes during the imaging time of 120 minutes, there is no scene to be thinned out, and the pre-recording time is 120 minutes.

In the case where there are scenes where tags are placed for 30 minutes during the imaging time of 120 minutes, when the remaining scenes where tags are not placed, which total 90 minutes, are recorded at a thinning-out rate of 4, the pre-recording time is 30+(90/4)=52.5 minutes.

As described above, the pre-recording time varies in the range from 30 minutes to 120 minutes depending on the proportion of the time of scenes with tags to the entire time.

Examples of calculation of the thinning-out rate are described for several cases where the tags and the levels of importance are assigned in different ways.

Generally, scenes where tags are placed are present in a discrete manner in a recorded video, and a part between those scenes is a scene with no tag. However, in order to describe special cases and facilitate the description, it is assumed in the following description that there are 12 scenes in a video of 120 minutes, and a scene with a tag has a length of several minutes. Further, although the digits after the second decimal place are omitted to simplify the description, the digits after the second decimal place may be taken into consideration in practice.

FIGS. 5, 7, 9, 11, 13, 15 and 17 are views showing the relationship of a scene number (No.), a scene imaging time, a mark (*) indicating a scene where a tag is placed, the order of importance of a marked scene, a pre-recording time, a thinning-out rate and a final recording time. FIGS. 6, 8, 10, 12, 14, 16 and 18 are views showing the relationship between an imaging recording time, a pre-recording time and a final recording time. FIGS. 5 to 18 are described with reference to the flowcharts of FIGS. 2 to 4.

<Case 1>

In Case 1, a standard example is described with reference to FIGS. 5 and 6.

First, by the processing of Step S504 in FIG. 2, the scenes 2, 4, 6, 7, 9, 10, 11 and 12 where tags are not placed are thinned out to ¼ as the pre-recording time. Further, the scenes 1, 3, 5 and 8 where tags are placed are not thinned out, and the scene imaging time is used as the pre-recording time.

Then, because the total pre-recording time (50.25 minutes) is longer than the target recording time (30 minutes), the determination in Step S506 of FIG. 3 results in Yes. It is thus necessary to set the thinning-out rate to fall within the target recording time.

Then, as initially allocated values, the total final recording time of scenes with a high level of importance (first set time) is set to 15 minutes, the total final recording time of scenes with a low level of importance (second set time) is set to 10 minutes, and the total final recording time of scenes with no tags (third set time) is set to 5 minutes.

After that, the pre-recording time of the most importance scene 1 is 6 minutes, which is shorter than the first set time (15 minutes), and therefore the determination in Step S508 of FIG. 3 results in Yes, and the first set time is not changed.

Then, the total pre-recording time of the scenes 1, 3, 5 and 8 where tags are placed is 27 minutes, which is longer than the first set time (15 minutes), and therefore the determination in Step S510 of FIG. 3 results in No. Because the total pre-recording time of the scenes where tags are placed is not within the first set time, the scenes where tags are placed are excluded in ascending order of the level of importance by the loop processing of Steps S510 and S511. Then, because the total pre-recording time of the scenes 1 and 5 (9 minutes) is shorter than the first set time (15 minutes), the scenes 1 and 5 are set as the scenes S0 to S1 with a high level of importance, and the excluded scenes 3 and 8 are set as the scenes J0 to J1 with a low level of importance.

After that, because the scenes where tags are placed are not within the first set time, the determination in Step S512 of FIG. 3 results in Yes, and the total pre-playback time of the scenes with a low level of importance (second set time) is set. To be specific, the second set time is set to 16 minutes by adding a value (6 minutes) obtained by subtracting the pre-recording time of S0 to S1 (9 minutes) from the first set time (15 minutes) to the second set time (10 minutes).

Because the total pre-recording time of J0 to J1 (18 minutes) is longer than the second set time (16 minutes), and the determination in Step S514 of FIG. 4 results in No, the thinning-out rate for recording the scenes J0 to J1 within the second set time is determined. To be specific, the thinning-out rate is set to 18/16=1.125 by dividing the total pre-recording time of J0 to J1 (18 minutes) by the second set time (16 minutes).

Further, in order to reduce the total pre-recording time of the scenes with no tags (23.25 minutes) to within the total final recording time of the scenes with no tags (third set time) (5 minutes), the thinning-out rate is set to 23.25/5=4.65.

After that, it is checked whether the thinning-out rate of less important scenes (second thinning-out rate) is lower than the total thinning-out rate of less important scenes with no tags (third total thinning-out rate). To be specific, because the second thinning-out rate (1.125) is lower than the third total thinning-out rate (third thinning-out rate×pre-thinning-out rate=4.65×4=18.6), and the determination in Step S519 of FIG. 4 results in Yes, the second thinning-out rate and the third thinning-out rate are not changed. Then, the first thinning-out rate is set to 1, the second thinning-out rate is set to 1.125, and the third thinning-out rate is set to 4.65.

Figure 6:
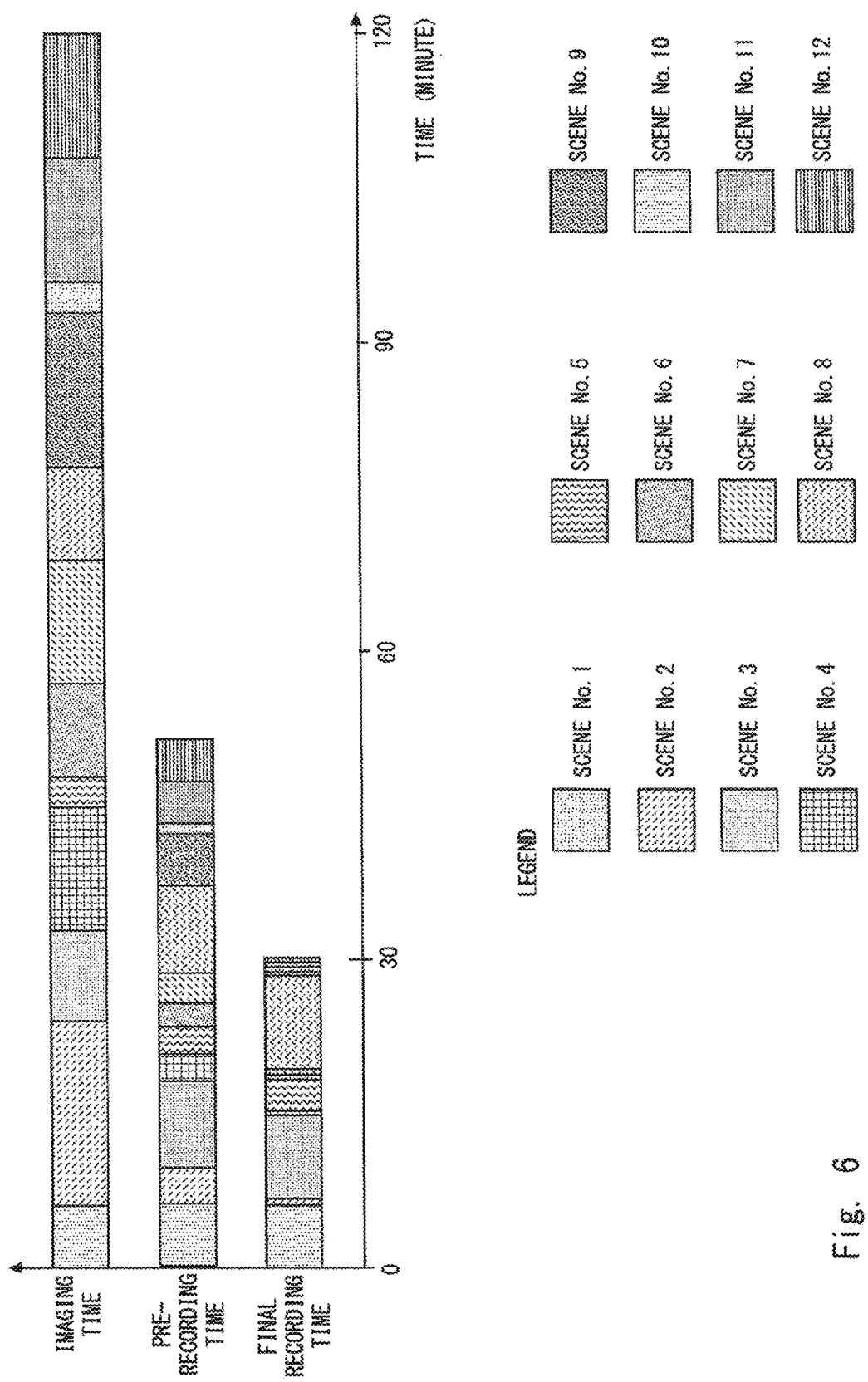
FIG. 6 is a view showing the relationship between a pre-recording time and a final recording time.

FIG. 6 shows the pre-recording time and the final recording time in the case where the first thinning-out rate, the second thinning-out rate and the third thinning-out rate are set as above.

<Case 2>

In Case 2, an example in which the pre-recording time of the most important scene is longer than the first set time and the determination in Step S508 of FIG. 3 results in No is described with reference to FIGS. 7 and 8.

First, by the processing of Step S504 in FIG. 2, the scenes 3, 5, 7, 8, 9, 10, 11 and 12 where tags are not placed are thinned out to ¼ as the pre-recording time. Further, the scenes 1, 2, 4 and 6 where tags are placed are not thinned out, and the scene imaging time is used as the pre-recording time.

Then, because the total pre-recording time (63.75 minutes) is longer than the target recording time (30 minutes), the determination in Step S506 of FIG. 3 results in Yes. It is thus necessary to set the thinning-out rate to fall within the target recording time.

Then, as initially allocated values, the total final recording time of scenes with a high level of importance (first set time) is set to 15 minutes, the total final recording time of scenes with a low level of importance (second set time) is set to 10 minutes, and the total final recording time of scenes with no tags (third set time) is set to 5 minutes.

Next, the pre-recording time of the most importance scene 2 is 18 minutes, which is longer than the first set time (15 minutes), and therefore the determination in Step S508 of FIG. 3 results in No, and the first set time is set to 18 minutes.

Then, the total pre-recording time of the scenes 1, 2, 4 and 6 where tags are placed is 45 minutes, which is longer than the first set time (18 minutes), and therefore the determination in Step S510 of FIG. 3 results in No. Because the total pre-recording time of the scenes where tags are placed is not within the first set time, the scenes where tags are placed are excluded in ascending order of the level of importance by the loop processing of Steps S510 and S511. Then, because the total pre-recording time of the scene 2 (18 minutes) is equal to or shorter than the first set time (18 minutes), the scene 2 is set as S0, and the scenes 1, 4 and 6 are set as J0 to J2.

After that, a result of subtracting the pre-recording time of S0 (18 minutes) from the first set time (18 minutes) is 0, and the determination in Step S512 of FIG. 3 results in NO, and the second set time is not changed.

Because the total pre-recording time of J0 to J2 (27 minutes) is longer than the second set time (10 minutes), and the determination in Step S514 of FIG. 4 results in No, the thinning-out rate is set to 27/10=2.7 in order to reduce the total pre-recording time of J0 to J2 (27 minutes) to within 10 minutes.

Further, in order to reduce the total pre-recording time of the scenes with no tags (18.75 minutes) to within the total final recording time of the scenes with no tags (third set time) (5 minutes), the thinning-out rate is set to 4×(18.75/5)=3.75.

After that, because the second thinning-out rate (2.7) is lower than the third total thinning-out rate (third thinning-out rate×pre-thinning-out rate=3.75×4=15), and the determination in Step S519 of FIG. 4 results in Yes, the second thinning-out rate and the third thinning-out rate are not changed. Then, the first thinning-out rate is set to 1, the second thinning-out rate is set to 2.7, and the third thinning-out rate is set to 3.75

Figure 8:
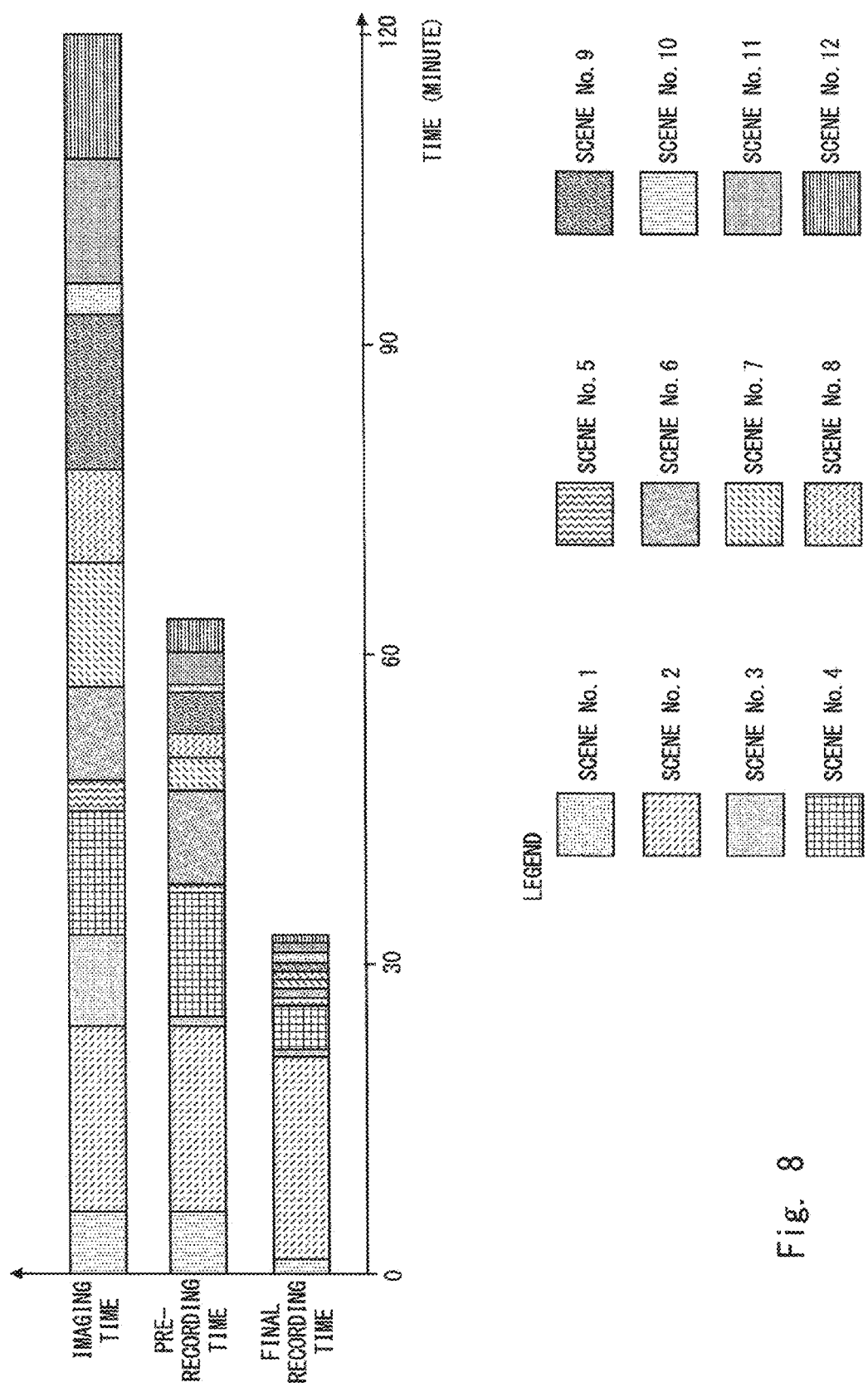
FIG. 8 is a view showing the relationship between a pre-recording time and a final recording time.

FIG. 8 shows the pre-recording time and the final recording time in the case where the first thinning-out rate, the second thinning-out rate and the third thinning-out rate are set as above.

Note that, in Case 2, the pre-recording time of the most important scene is longer than the initial value of the first set time by 3 minutes in the determination in Step S508 of FIG. 3, if the initial value of the first set time remains 15 minutes, the total recording time is 33 minutes.

Although one possible processing is to adjust the final recording time by reducing the second set time and the third set time by the amount that the most important scene exceeds the first set time, because it is a rare case that does not usually occur in normal video shooting and further processing in the case where the most important scene is equal to or longer than the target recording time arises, such processing is not performed, and the first set time is set as the pre-recording time of the most important scene.

Further, because the thinning-out rate of the most important scene is 1 as a general rule, although the entire final recording time increases by the amount that the most important scene exceeds the first set time, the thinning-out rate may be set so that it is within 30 minutes (at a thinning-out rate of 33/30=1.1 for 30 minutes) from the final recording time that is finally calculated as postprocessing.

<Case 3>

In Case 3, an example in which there is no scene that is excluded because it is longer than the first set time and the determination in Step S512 of FIG. 3 results in No is described with reference to FIGS. 9 and 10.

First, by the processing of Step S504 in FIG. 2, the scenes 2, 3, 4, 6, 7, 8, 9, 11 and 12 where tags are not placed are thinned out to ¼ as the pre-recording time. Further, the scenes 1, 5 and 10 where tags are placed are not thinned out, and the scene imaging time is used as the pre-recording time.

Then, because the total pre-recording time (39 minutes) is longer than the target pre-recording time (30 minutes), the determination in Step S506 of FIG. 3 results in Yes. Thus, when the video is recorded at a thinning-out rate of 1, it cannot be within the target recording time, and it is therefore necessary to set the thinning-out rate to fall within the target pre-recording time.

Then, as initially allocated values, the total final recording time of scenes with a high level of importance (first set time) is set to 15 minutes, the total final recording time of scenes with a low level of importance (second set time) is set to 10 minutes, and the total final recording time of scenes with no tags (third set time) is set to 5 minutes.

Next, the pre-recording time of the most importance scene 5 is 3 minutes, which is shorter than the first set time (15 minutes), and therefore the determination in Step S508 of FIG. 3 results in Yes, and the first set time is not changed.

Then, the total pre-recording time of the scenes 1, 5 and 10 where tags are placed is 12 minutes, which is shorter than the first set time (15 minutes), and the determination in Step S510 of FIG. 4 results in Yes. Thus, because the total pre-recording time of the scenes where tags are placed is within the first set time, the scenes 1, 5 and 10 are set as the scenes S0 to S2 with a high level of importance. Note that J0 to Jm corresponding to the excluded scenes are not set.

Because there is no excluded scene and the determination in Step S512 of FIG. 3 results in No, the third set time is set to 18 minutes, which is obtained by adding the second set time (10 minutes) to the first set time (15 minutes) and then adding the third set time (5 minutes) and then subtracting the total pre-recording time of S0 to S2 (12 minutes).

Further, in order to reduce the total pre-recording time of the scenes with no tags (27 minutes) to within the total final recording time of the scenes with no tags (third set time) (18 minutes), the thinning-out rate is set to 27/18=1.5.

Then, when the second thinning-out rate is not set, the determination in Step S519 of FIG. 4 is Yes, and therefore (the second thinning-out rate and) the third thinning-out rate are not changed. Then, the first thinning-out rate is set to 1, the second thinning-out rate is not set, and the third thinning-out rate is set to 1.5.

Figure 10:
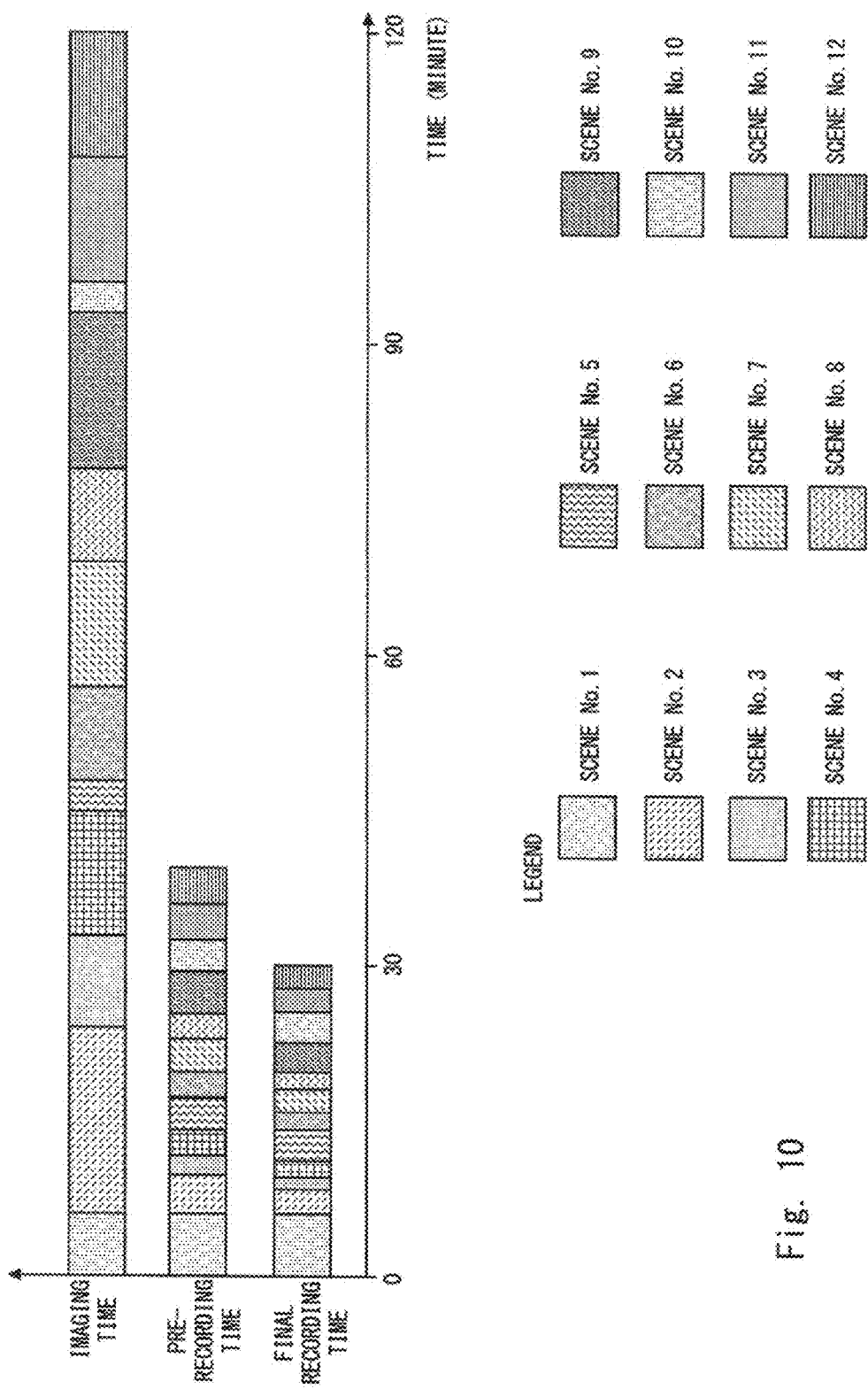
FIG. 10 is a view showing the relationship between a pre-recording time and a final recording time.

FIG. 10 shows the pre-recording time and the final recording time in the case where the first thinning-out rate, the second thinning-out rate and the third thinning-out rate are set as above.

<Case 4>

In Case 4, an example in which the determination in Step S514 of FIG. 4 results in Yes is described with reference to FIGS. 11 and 12.

First, by the processing of Step S504 in FIG. 2, the scenes 2, 4, 6, 7, 8, 9, 11 and 12 where tags are not placed are thinned out to ¼ as the pre-recording time. Further, the scenes 1, 3, 5 and 10 where tags are placed are not thinned out, and the scene imaging time is used as the pre-recording time.

Then, because the total pre-recording time (45.75 minutes) is longer than the target pre-recording time (30 minutes), the determination in Step S506 of FIG. 3 results in Yes. It is thus necessary to set the thinning-out rate to fall within the target pre-recording time.

Then, as initially allocated values, the total final recording time of scenes with a high level of importance (first set time) is set to 15 minutes, the total final recording time of scenes with a low level of importance (second set time) is set to 10 minutes, and the total final recording time of scenes with no tags (third set time) is set to 5 minutes.

Next, the pre-recording time of the most importance scene 5 is 3 minutes, which is shorter than the first set time (15 minutes), and therefore the determination in Step S508 of FIG. 3 results in Yes, and the first set time is not changed.

Then, the total pre-recording time of the scenes 1, 3, 5 and 10 where tags are placed is 21 minutes, which is longer than the first set time (15 minutes), and therefore the determination in Step S510 of FIG. 3 results in No. Because the total pre-recording time of the scenes where tags are placed is not within the first set time, the scenes where tags are placed are excluded in ascending order of the level of importance by the loop processing of Steps S510 and S511. Then, because the total pre-recording time of the scenes 1, 5 and 10 is 12 minutes, which is shorter than the first set time (15 minutes), the scenes 1, 5 and 10 are set as the scenes S0 to S2, and the scene 3 is set as the scene J0.

After that, because the scenes where tags are placed are not within the first set time, the determination in Step S512 of FIG. 3 results in Yes, and the second set time is set to 13 minutes by adding a value (3 minutes) obtained by subtracting the pre-recording time of S0 (12 minutes) from the first set time (15 minutes) to the second set time.

Because the pre-recording time of J0 (9 minutes) is shorter than the second set time (13 minutes), and the determination in Step S514 of FIG. 4 results in Yes, the thinning-out rate of J0 is set to 1.

Then, the third set time is set to 9 minutes by adding a value (4 minutes) obtained by subtracting the pre-recording time of J0 (9 minutes) from the second set time (13 minutes) to the third set time.

Further, in order to reduce the total pre-recording time of the scenes with no tags (24.75 minutes) to within the total final recording time of the scenes with no tags (third set time) (9 minutes), the thinning-out rate is set to 24.75/9=2.75.

Because the second thinning-out rate (1) is lower than the third total thinning-out rate (third thinning-out rate×pre-thinning-out rate=2.75×4=11), and the determination in Step S519 of FIG. 4 results in Yes, the second thinning-out rate and the third thinning-out rate are not changed. Then, the first thinning-out rate is set to 1, the second thinning-out rate is set to 1, and the third thinning-out rate is set to 2.75.

Figure 12:
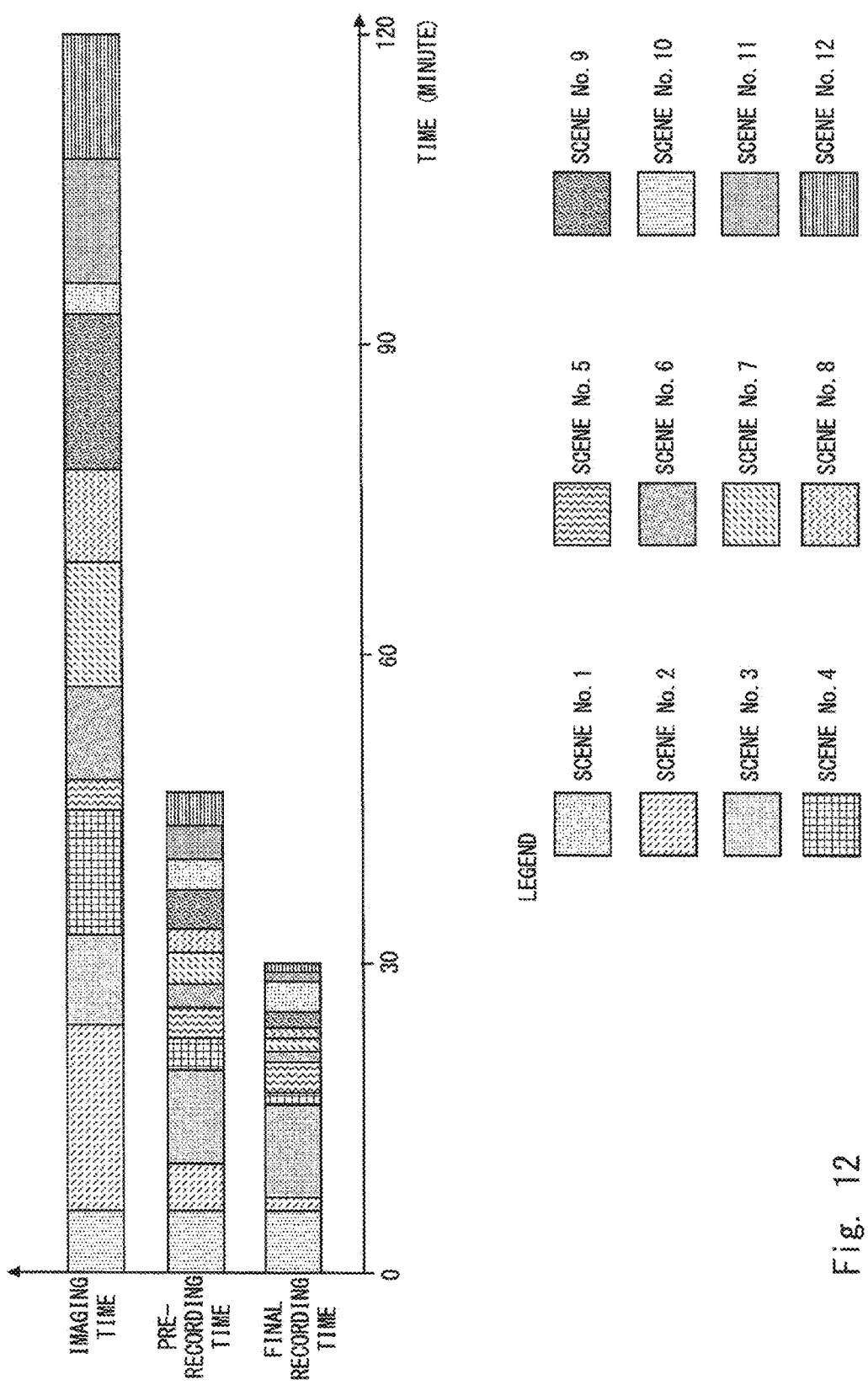
FIG. 12 is a view showing the relationship between a pre-recording time and a final recording time.

FIG. 12 shows the pre-recording time and the final recording time in the case where the first thinning-out rate, the second thinning-out rate and the third thinning-out rate are set as above.

<Case 5>

In Case 5, an example in which the determination in Step S519 of FIG. 4 results in No is described with reference to FIGS. 13 and 14.

First, by the processing of Step S504 in FIG. 2, the scenes 8 and 11 where tags are not placed are thinned out to ¼ as the pre-recording time. Further, the scenes 1, 2, 3, 4, 5, 6, 7, 9, 10 and 12 where tags are placed are not thinned out, and the scene imaging time is used as the pre-recording time.

Then, because the total pre-recording time (104.25 minutes) is longer than the target pre-recording time (30 minutes), the determination in Step S506 of FIG. 3 results in Yes. It is thus necessary to set the thinning-out rate to fall within the target pre-recording time.

Then, as initially allocated values, the total final recording time of scenes with a high level of importance (first set time) is set to 15 minutes, the total final recording time of scenes with a low level of importance (second set time) is set to 10 minutes, and the total final recording time of scenes with no tags (third set time) is set to 5 minutes.

After that, the pre-recording time of the most importance scene 5 is 3 minutes, which is shorter than the first set time (15 minutes), and therefore the determination in Step S508 of FIG. 3 results in Yes, and the first set time is not changed.

Then, the total pre-recording time of the scenes 1, 2, 3, 4, 5, 6, 7, 9, 10 and 12 where tags are placed is 99 minutes, which is longer than the first set time (15 minutes), and therefore the determination in Step S510 of FIG. 3 results in No. Because the total pre-recording time of the scenes where tags are placed is not within the first set time, the scenes where tags are placed are excluded in ascending order of the level of importance by the loop processing of Steps S510 and S511. Then, because the total pre-recording time of the scenes 1, 5 and 10 is 12 minutes, which is shorter than the first set time (15 minutes), the scenes 1, 5 and 10 are set as the scenes S0 to S2 with a high level of importance, and the excluded scenes 2, 3, 4, 6, 7, 9 and 12 are set as the scenes J0 to J6 with a low level of importance.

After that, because the scenes where tags are placed are not within the first set time, the determination in Step S512 of FIG. 3 results in Yes, and the second set time is set to 13 minutes by adding a value (3 minutes) obtained by subtracting the pre-recording time of S0 to S2 (12 minutes) from the first set time (15 minutes) to the second set time.

Because the pre-recording time of J0 to J6 (87 minutes) is longer than the second set time (13 minutes), and the determination in S514 of FIG. 5 results in No, in order to reduce the playback time of J0 to J6 to be within 13 minutes, the thinning-out rate is set to 87/13=6.69.

Further, in order to reduce the total pre-recording time of the scenes with no tags (5.25 minutes) to within the total final recording time of the scenes with no tags (third set time) (5 minutes), the thinning-out rate is set to 5.25/5=1.05.

Because the second thinning-out rate (6.69) is higher than the third total thinning-out rate (third thinning-out rate×pre-thinning-out rate=1.05×4=4.2), and the determination in Step S519 of FIG. 4 results in No, the second thinning-out rate and the third thinning-out rate are calculated again. To be specific, the second thinning-out rate and the third total thinning-out rate are set to 108/18=6 in order to reduce the sum total (108 minutes) of the pre-recording time of J0 to J6 (87 minutes) and the pre-recording time of the scenes with no tags (5.25 minutes) multiplied by the pre-thinning-out rate (4) to within the sum (18 minutes) of the second playback time and the third playback time, and the third thinning-out rate is set to 6/4=1.5 by eliminating the pre-thinning-out rate.

Then, the first thinning-out rate is set to 1, the second thinning-out rate is set to 6, and the third thinning-out rate is set to 1.5.

Figure 14:
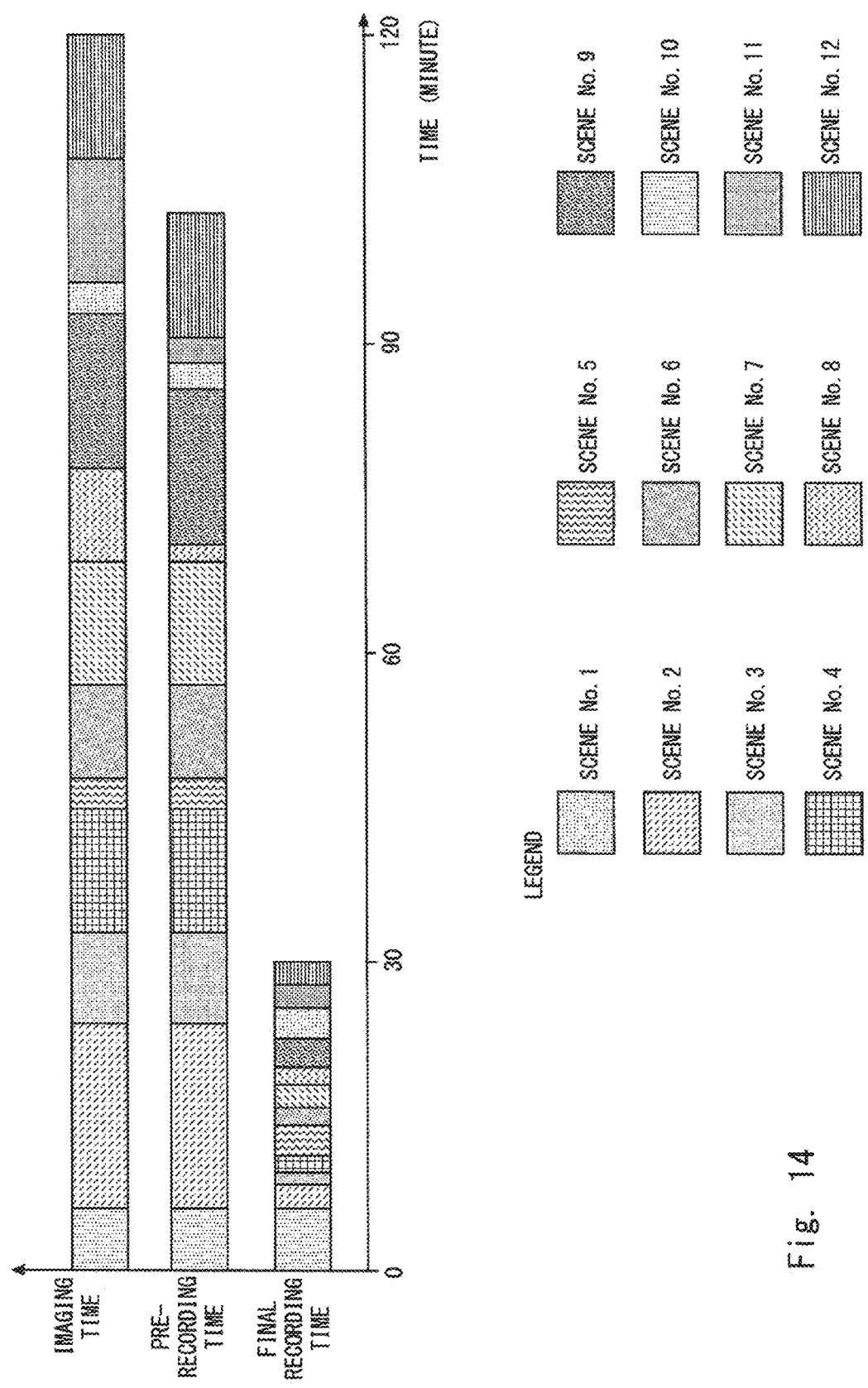
FIG. 14 is a view showing the relationship between a pre-recording time and a final recording time.

FIG. 14 shows the pre-recording time and the final recording time in the case where the first thinning-out rate, the second thinning-out rate and the third thinning-out rate are set as above.

<Case 6>

In Case 6, an example in which tags are placed on all scenes is described with reference to FIGS. 15 and 16.

First, by the processing of Step S505 in FIG. 2, the scenes 1, 2, 3, 4, 5, 6, 7, 8, 9, 10, 11 and 12 where tags are placed are not thinned out, and the scene imaging time is used as the pre-recording time.

Then, because the total pre-recording time (120 minutes) is longer than the target pre-recording time (30 minutes), the determination in Step S506 of FIG. 3 results in Yes. It is thus necessary to set the thinning-out rate to fall within the target pre-recording time.

Then, as initially allocated values, the total final recording time of scenes with a high level of importance (first set time) is set to 15 minutes, the total final recording time of scenes with a low level of importance (second set time) is set to 10 minutes, and the total final recording time of scenes with no tags (third set time) is set to 5 minutes.

After that, the pre-recording time of the most importance scene 5 is 3 minutes, which is shorter than the first set time (15 minutes), and therefore the determination in Step S508 of FIG. 3 results in Yes, and the first set time is not changed.

Then, the total pre-recording time of the scenes 1, 2, 3, 4, 5, 6, 7, 8, 9, 10, 11 and 12 where tags are placed is 120 minutes, which is longer than the first set time (15 minutes), and therefore the determination in Step S510 of FIG. 3 results in No. Because the total pre-recording time of the scenes where tags are placed is not within the first set time, the scenes where tags are placed are excluded in ascending order of the level of importance by the loop processing of Steps S510 and S511. Then, because the total pre-recording time of the scenes 1, 5 and 10 is 12 minutes, which is shorter than the first set time (15 minutes), the scenes 1, 5 and 10 are set as the scenes S0 to S2 with a high level of importance, and the excluded scenes 2, 3, 4, 6, 7, 8, 9, 11 and 12 are set as the scenes J0 to J8 with a low level of importance.

After that, because the determination in Step S512 of FIG. 3 results in Yes, the second set time is set to 13 minutes by adding a value (3 minutes) obtained by subtracting the pre-recording time of S0 to S2 (12 minutes) from the first set time (15 minutes) to the second set time.

Because the total pre-recording time of J0 to J8 (108 minutes) is longer than the second set time (13 minutes), and the determination in S514 of FIG. 5 results in No, in order to reduce the final recording time of J0 to J8 to within 13 minutes, the thinning-out rate is set to 108/13=8.3. Further, because there is no scene with no tag, the third thinning-out rate is not set.

Because the third thinning-out rate is not set, the determination in Step S519 of FIG. 4 is No as an exception, and the second thinning-out rate (and the third thinning-out rate), and the second thinning-out rate are calculated again. To be specific, the second thinning-out rate is set to 108/18=6 in order to reduce the total pre-recording time of J0 to J8 (108 minutes) to within the sum (18 minutes) of the second playback time and the third playback time.

Then, the first thinning-out rate is set to 1, the second thinning-out rate is set to 6, and the third thinning-out rate is not set.

Figure 16:
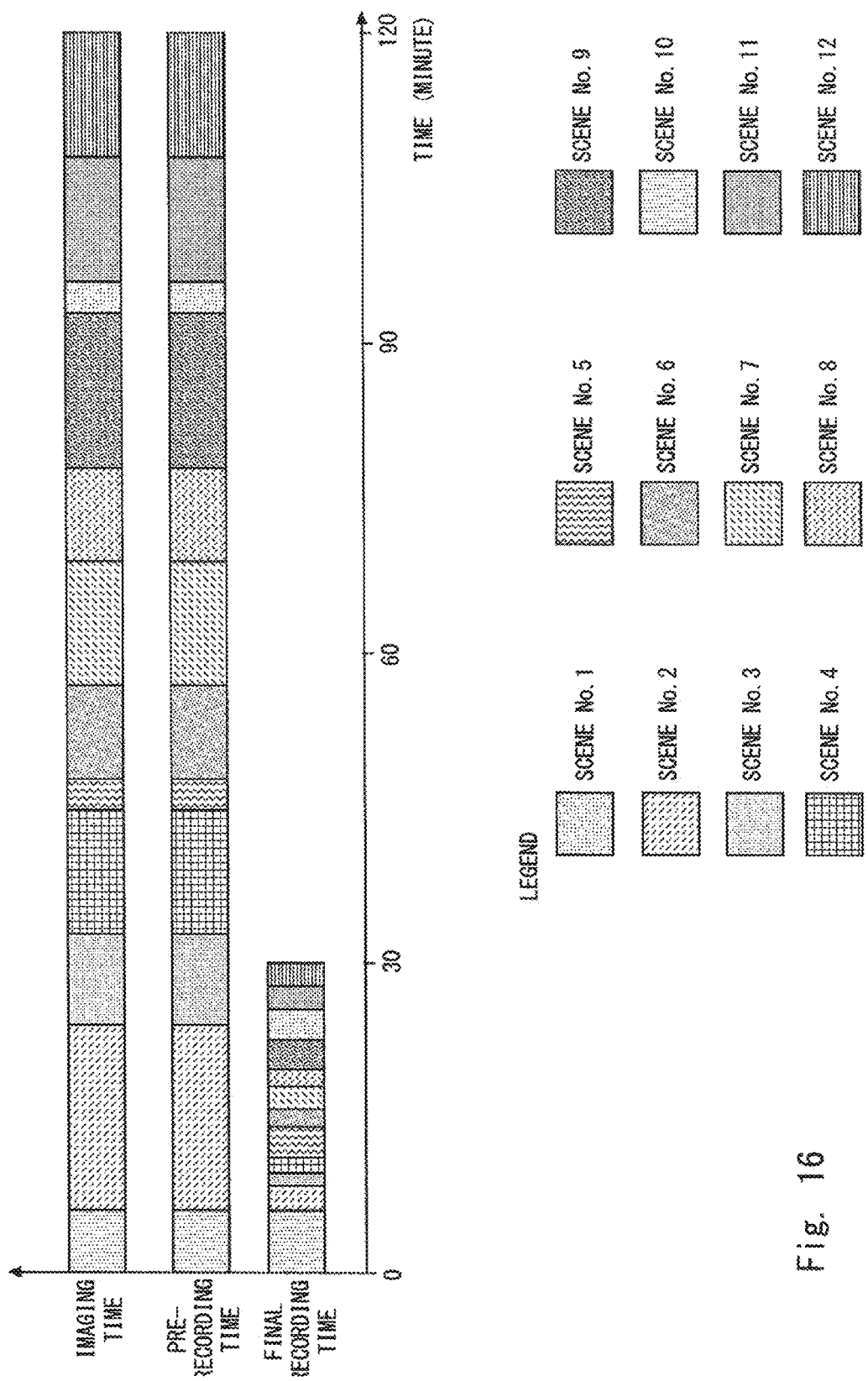
FIG. 16 is a view showing the relationship between a pre-recording time and a final recording time.

FIG. 16 shows the pre-recording time and the final recording time in the case where the first thinning-out rate, the second thinning-out rate and the third thinning-out rate are set as above.

<Case 7>

In Case 7, an example in which tags are not placed at all, and the pre-recording time is longer than 30 minutes is described (not shown in the figure).

First, by the processing of Step S504 in FIG. 2, the scenes 1, 2, 3, 4, 5, 6, 7, 8, 9, 10, 11 and 12 where tags are not placed are thinned out to ¼ as the pre-recording time.

Then, because the total pre-recording time is longer than the target pre-recording time (30 minutes), the determination in Step S506 of FIG. 3 results in Yes. It is thus necessary to set the thinning-out rate to fall within the target pre-recording time.

Then, as initially allocated values, the total final recording time of scenes with a high level of importance (first set time) is set to 15 minutes, the total final recording time of scenes with a low level of importance (second set time) is set to 10 minutes, and the total final recording time of scenes with no tags (third set time) is set to 5 minutes.

The pre-recording time of the most importance scene is 0 minute (there is no scene where a tag is placed), which is shorter than the first set time (15 minutes), and therefore the determination in Step S508 of FIG. 3 results in Yes, and the first set time is not changed.

There is no video with a high level of importance, and the pre-recording time of such a scene is 0 minute, and therefore the determination in Step S510 of FIG. 3 results in Yes.

Because there is no excluded scene and the determination in Step S512 of FIG. 3 results in No, the third set time is set to 30 minutes by adding a result of adding the second set time to the first set time and subtracting the pre-recording time of S0 to Sn to the third set time (5 minutes).

The third thinning-out rate is (time longer than the total pre-recording time 30 minutes/30 minutes)=a certain value larger than 1.

When the second thinning-out rate is not set, the determination in Step S519 of FIG. 4 results in Yes as an exception, and the second thinning-out rate and the third thinning-out rate are not changed. Then, the first thinning-out rate is set to 1 (note that, however, there is no corresponding scene), the second thinning-out rate is not set, and the third thinning-out rate is set to a certain value larger than 1.

<Case 8>

In Case 8, an example in which the pre-recording time is equal to or shorter than 30 minutes is described (not shown in the figure).

Because the total pre-recording time is equal to or shorter than the target pre-recording time (30 minutes), the determination in Step S506 of FIG. 3 results in No. It is thus not necessary to set the thinning-out rate to fall within the target pre-recording time.

As described above, the recording device according to this embodiment converts the frame rate of video data to a lower frame rate for scenes where tags are not placed, and does not convert the frame rate of the video data for scenes where tags are assigned, and after the end of imaging, further converts the frame rate of the video data after conversion for each scene so as to fall within a desired recording time. It is thereby possible to temporarily store the video data in a small storage size at the time of imaging, and further record the entire imaging data desired to be recorded within a limited length of time.

Further, in the recording device according to this embodiment, scenes with a high level of importance are recorded at a low thinning-out rate so as to fully record the content, and scenes with a low level of importance are recorded at a high thinning-out rate so as to reduce the time. It is thereby possible to record the entire imaging data desired to be recorded within a limited length of time.

Further, in the recording device according to this embodiment, scenes where tags are placed are recorded at a low thinning-out rate so as to fully record the content, and scenes where tags are not placed are recorded at a high thinning-out rate so as to reduce the time. It is thereby possible to record the entire imaging data desired to be recorded within a limited length of time.

Further, in the recording device according to this embodiment, important scenes where tags are placed are recorded at a low thinning-out rate so as to fully record the content, less important scenes where tags are placed are recorded at a high thinning-out rate and further scenes where tags are not placed are recorded at a still higher thinning-out rate so as to reduce the time. It is thereby possible to record the entire imaging data desired to be recorded within a limited length of time.

Data to be associated with a tag is not limited to video data, and any data containing audio or video, or both audio and video may be used.

Further, the tagging device 100 may be placed outside the recording device 200.

Hereinafter, one example of assignment of a tag and creation of information about the level of importance in the video data recorded by the recording device 200 is described hereinafter.

First, the overview of the tag range setting operation of the tag range processor 104 is described. As described above, the tag range processor 104 sets a tag in an appropriate range of video data taken by the camera 202 by using the received sensor data and input tag data.

Figure 17:
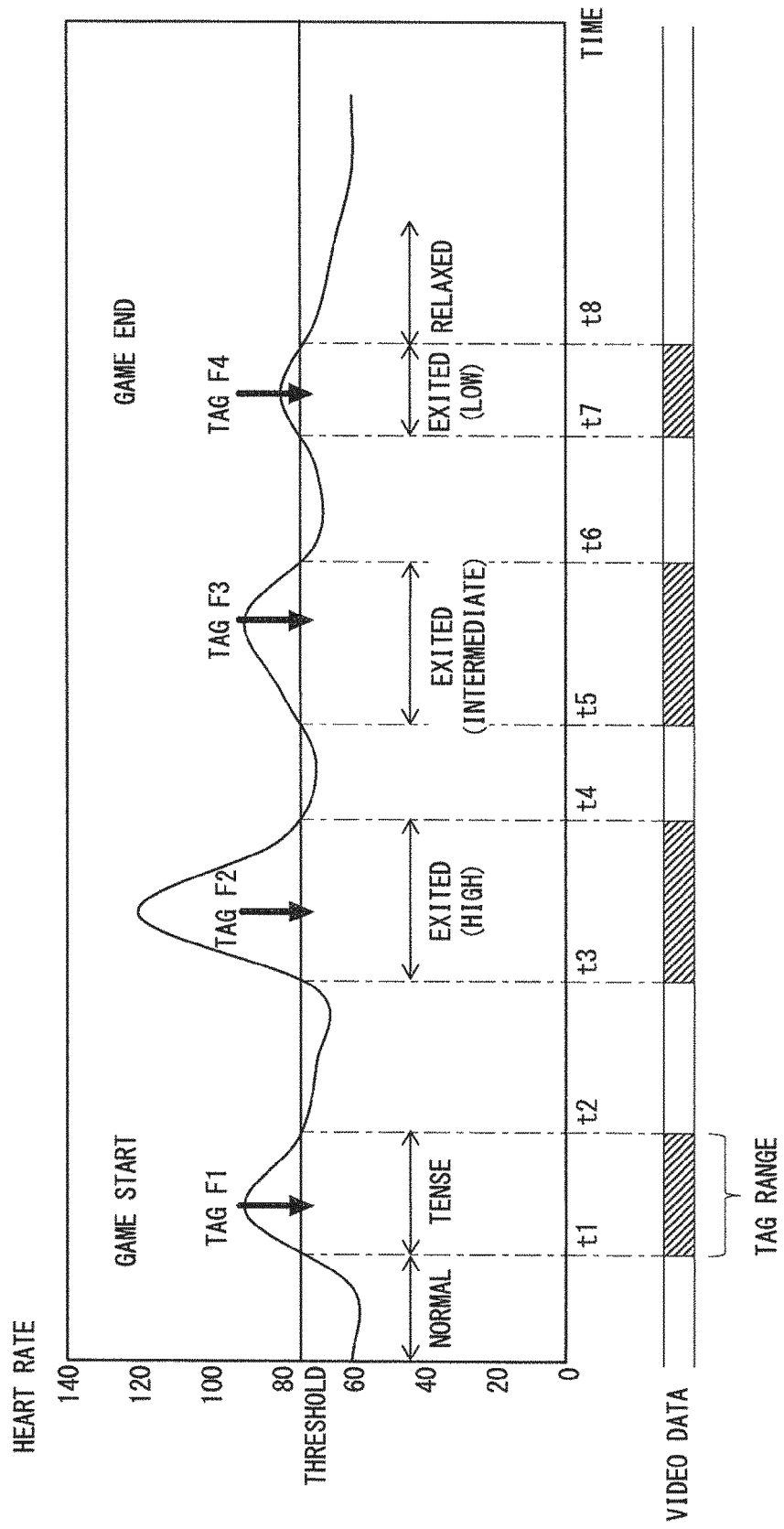
FIG. 17 is a view showing the relationship between a change in heart rate over time and the range of a tag according to the embodiment.

FIG. 17 is a view showing the relationship between a change in heart rate over time and the range of a tag according to the embodiment. The graph of a heart rate with input tag data is shown in the upper part of FIG. 17, and a tag range that is set based on the input tag data is shown in association with video data in the lower part of FIG. 17. The horizontal axis of the heart rate graph indicates time, and the vertical axis indicates a heart rate. Further, the horizontal line drawn at a heart rate of about 75 indicates a threshold for setting a tag range. Further, the horizontal arrow that is placed at a heart rate of about 40 and the text such as "normal" and "tense" indicate the state of a user at that time.

In the example of the heart rate shown in FIG. 17, the state of a user changes from normal, tense or excited and normal (relaxed) again from the start to the end of a game based on a change in heart rate. In the tense or excited state, four peaks (1 to 4) of the heart rate occur, and the user inputs tags F1 to F4 at the respective peaks.

The tag range processor 104 sets, as the range of a tag F input by a user, a time range where the heart rate is equal to or more than a specified value (which is a threshold of 75 in this example) and in which the user inputs the tag F.

For example, as for the first peak, because the heart rate exceeds the specified value and the user inputs the tag F1 in the time range t1 to t2, the time range t1 to t2 is set as the tag range of the tag F1. Further, as for the second peak, because the heart rate exceeds the specified value and the user inputs the tag F2 in the time range t3 to t4, the time range t3 to t4 is set as the tag range of the tag F2. The same applies to the third and fourth peaks.

Note that, even when the heart rate is equal to or more than a specified value in a certain tag range, the tag range processor 104 does not set the time range as a tag range if a user does not input the tag F in that time range.

Further, even when a user inputs the tag F in a certain time range, the tag range processor 104 does not set the time range as a tag range if the heart rate is not equal to or more than a specified value in that time range.

The detailed procedure of the tag range processor 104 is described hereinafter.

Figure 18:
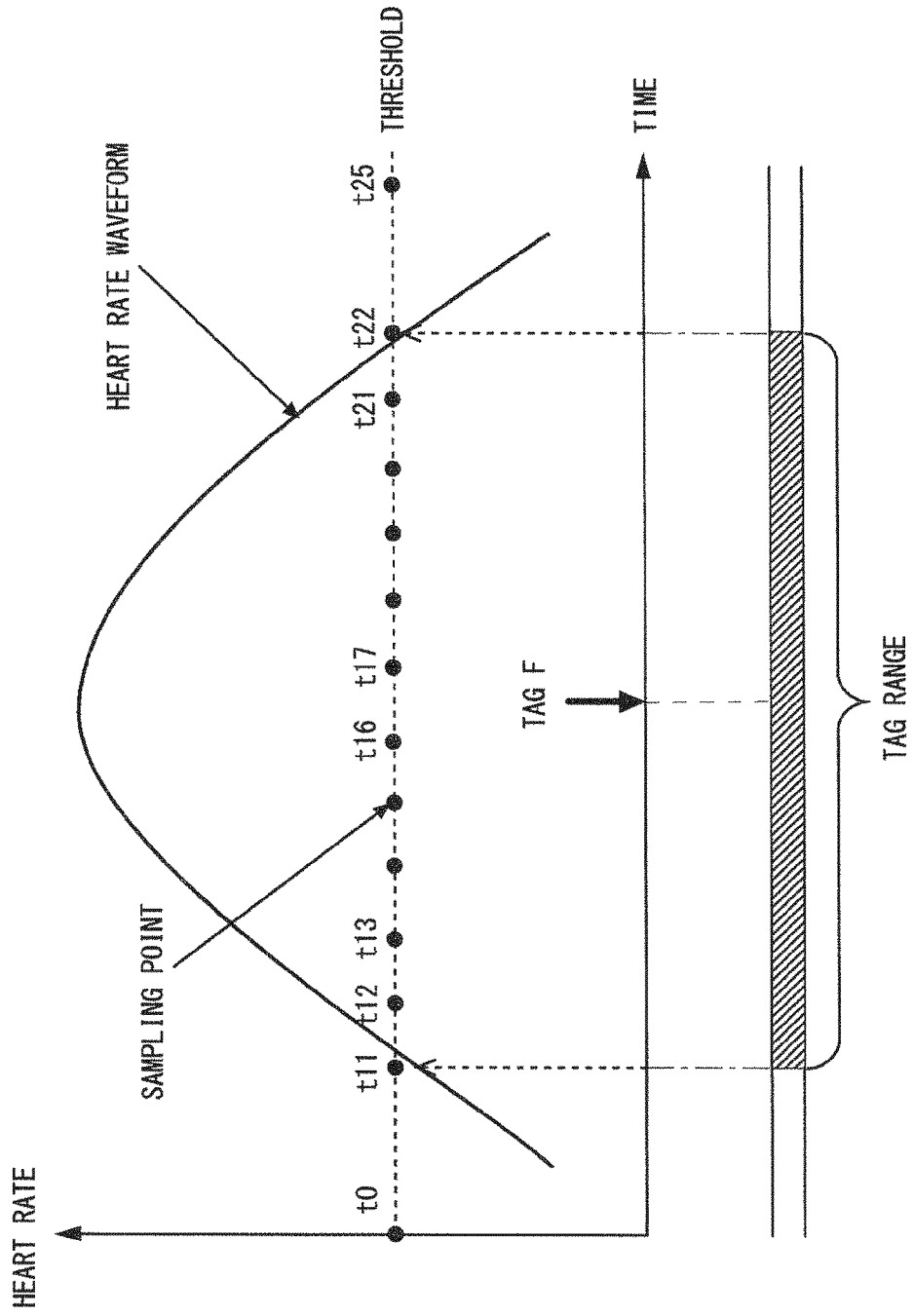
FIG. 18 is a view showing the detailed relationship between a change in heart rate over time and the range of a tag according to the embodiment.

FIG. 18 is a view showing the detailed relationship between a change in heart rate over time and the range of a tag according to this embodiment. The heart rate graph is shown in the upper part, and the tag range is shown in the lower part of FIG. 18. The horizontal dotted line in the graph indicates a threshold, and the equally spaced points on the horizontal dotted line indicate sampling points, which is sampling time, of the heart rate. Note that sampling of the heart rate is done at intervals of 1 second, for example.

Figure 19:
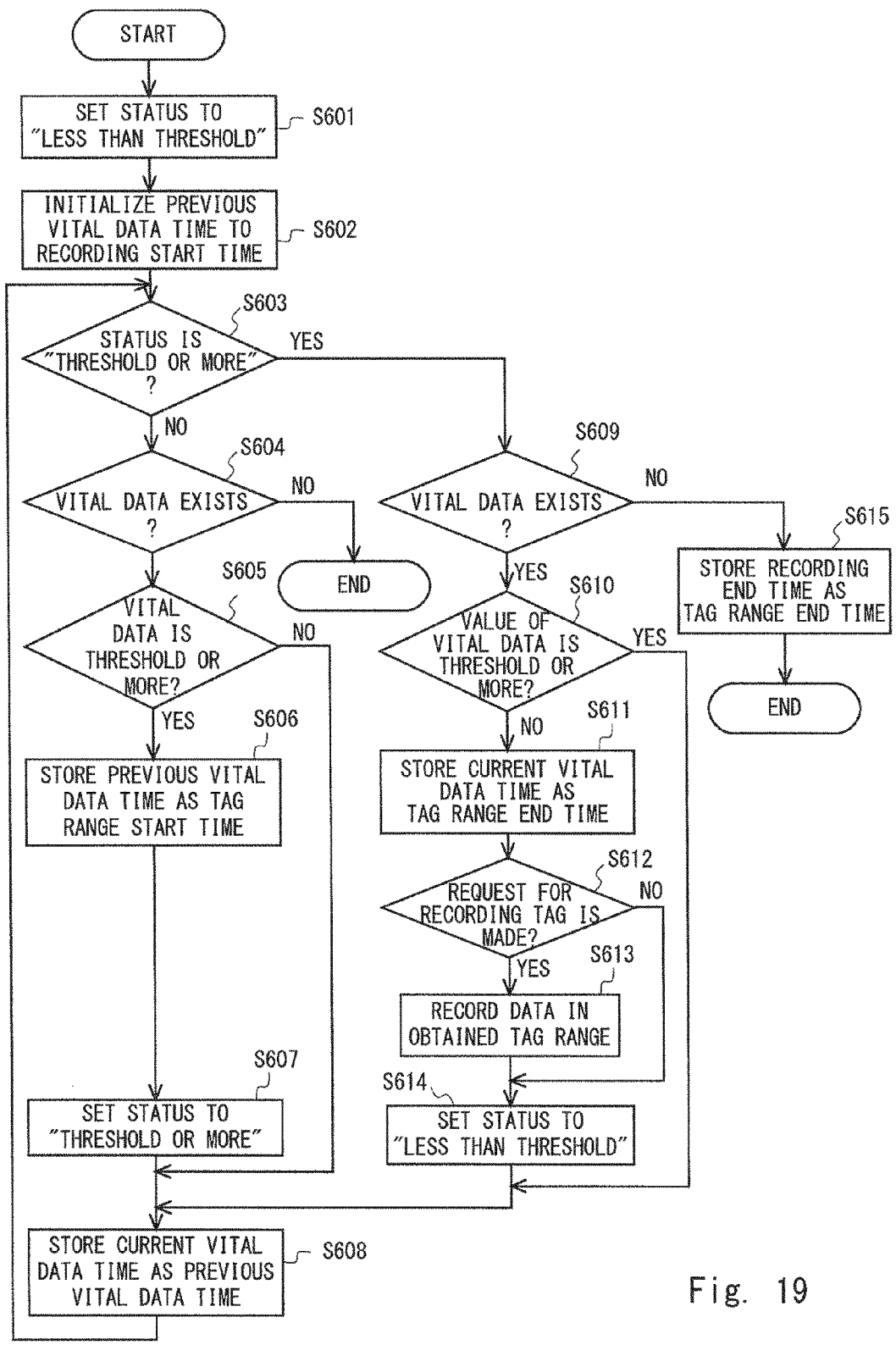
FIG. 19 is a flowchart showing the detailed procedure of a tag range processor according to the embodiment.

FIG. 19 is a flowchart showing the detailed procedure of the tag range processor 104 according to this embodiment.

The detailed procedure of the tag range processor 104 is described hereinafter with reference to FIGS. 18 and 19.

When the process starts, "status" indicating the status of vital data is set to "less than threshold" (Step S601), and "previous vital data time value" is initialized to a recording start time t0 (Step S602).

At the sampling time t0, it is determined whether the status is "threshold or more" (Step S603). Because the status remains "less than threshold" set in Step S601 (No in Step S603), it is determined whether there is the received vital data at the time t0 (Step S604).

Because the received vital data exists at the time t0 (Yes in Step S604), it is determined whether the value of the vital data at the time t0 is equal to or more than the threshold (Step S605). As shown in FIG. 18, because the value of the vital data at the time t0 is less than the threshold (No in Step S605), the current vital data time t0 is stored as "previous vital data time value" (Step S608). Then, the process returns to Step S603. The same processing is repeated until the time t11 because it is in the normal state where the vital data is less than the threshold. At the sampling time t12, because the status is "less than threshold" and the vital data at t12 exists (No in Step S603 and Yes in Step S604), it is determined whether the value of the vital data at the time t12 is equal to or more than the threshold (Step S605). As shown in FIG. 18, because the value of the vital data at the time t12 is equal to or more than the threshold (Yes in Step S605), "previous vital data time value", which is the time t11 stored in Step S608, is stored as "tag range start time value" (Step S606), the status is set to "threshold or more" (Step S607), the current vital data time t12 is stored as "previous vital data time value" (Step S608), and then the process returns to Step S603.

Then, at the sampling time t13, because the status is "threshold or more" as set in Step S607 (Yes in Step S603), it is determined whether there is the vital data at the time t13 (Step S609).

Because the received vital data exists at the time t13 (Yes in Step S609), it is determined whether the value of the vital data at the time t13 is equal to or more than the threshold (Step S610). As shown in FIG. 18, because the value of the vital data at the time t13 is equal to or more than the threshold (Yes in Step S610), the current vital data time t13 is stored as "previous vital data time value" (Step S608), and the process returns to Step S603.

The same processing as at the time t13 continues until the sampling time t21.

At the sampling time t22, because the status is "threshold or more" and the received vital data at t22 exists (Yes in Step S603 and Yes in Step S609), it is determined whether the value of the vital data at the time t22 is equal to or more than the threshold (Step S610). As shown in FIG. 18, because the value of the vital data at the time t22 is less than the threshold (No in Step S610), the current vital data time t22 is stored as "tag range end time value" (Step S611), and it is determined whether there is a request for recording a tag, which is, whether a tag is input when the value of the vital data is equal to or more than the threshold (Step S612). As shown in FIG. 18, because a user inputs the tag F between the time t16 and the time t17 (Yes in Step S612), the tag F is recorded in the tag range "tag range start time value" t11 to "tag range end time value" t22 obtained in Steps S606 and S611 (Step S613), the status is set to "less than threshold" (Step S614), the current vital data time t22 is stored as "previous vital data time value" (Step S608), and then the process returns to Step S603.

Then, at the sampling time t25, because the status is "less than threshold" and the vital data at t25 does not exist (No in Step S603 and No in Step S604), the process ends.

Note that the current vital data time t is stored as "tag range end time value" (Step S611), and when there is no request for recording a tag, which is when a user does not input a tag (No in Step S612), the status is set to "less than threshold" (Step S614). Thus, as described above, even when there is a time range where the heart rate is equal to or more than a specified value, the time range is not set as a tag range if a user does not input the tag in that time range.

Further, when the status is "threshold or more" and the vital data at that time t does not exist (Yes in Step S603 and No in Step S609), the recording end time is stored as "tag range end time value" (Step S615), and when there is a request for recording a tag, the tag F is recorded in the obtained tag range and then the process ends, and when there is no request for recording a tag, the process ends as in Steps S612 and S613.

The tagging device 100 according to this embodiment can thereby accurately assign a tag in an important range while taking video data.

Note that, although the tagging device 100 according to this embodiment selects the time t11 to t22 as the time range where the heart rate exceeds a threshold and sets this time range as the tag range, it may select the time t12 to time t21 respectively corresponding to the next and previous sampling time as the tag range. As a matter of course, the time t11 to t21 or the time t12 to t22 may be selected as the time range, and further a range between intersection points where the heart rate exceeds a threshold may be selected as the time range. In this case, the intersections may be calculated, and the sampling number of a video and the sampling number of vital data may be set to be the same.

Further, although a threshold of the heart rate for setting the tag range is fixed in the tagging device 100 according to this embodiment, the threshold may be set depending on situation such as for each user or for each scene. Further, the threshold may be made variable at any time, so that the tag range can be adjusted even after recording video data.

Further, in the tagging device 100 according to this embodiment, when the heart rate is equal to or more than a specified value and a user inputs a tag in a certain time range, the time range is set as the tag range. However, when the heart rate is equal to or more than a specified value and a user inputs a tag in a certain time range, a specified time before and after the tag input by the user, which is 3 seconds before and after the tag, for example, may be set as the tag range. As a matter of course, a user may select the time range where the heart rate is equal to or more than a specified value or the specified time before and after the tag.

Further, although the heart rate is used as the vital data in the tagging device 100 according to this embodiment, data other than the heart rate, such as data indicating the degree of excitement of a user, may be used as the vital data, and in this case, when a time range where the vital data is equal to or less than a threshold or less than a threshold and where a user inputs a tag may be set as the tag range.

Further, although the tagging device 100 according to this embodiment includes a sensor device 310, a tag input device 320, a camera 202 and the like, the recording device may serve also as the sensor device and the tag input device, or the recording device may serve also as one of the sensor device and the tag input device. In other words, the tagging system may be configured as a tagging device.

Further, although the tagging device 100 according to this embodiment sets a tag range based on user's vital data and input tag data when the user takes a video using the camera 202, which is, when the user records video data, it may set a tag range based on user's vital data and input tag data when the user views or edits a video using an image processing device or the like, which is, when the user plays back video data. Thus, the tagging device according to this embodiment is not limited to an imaging device, and it may be an image processing device or the like.

The camera 202 according to this embodiment includes a data communication unit 337 that continuously receives vital data of a user who records or plays back video data and also receives timing data about tag input by the user, and a tag range processor 104 that, when a time corresponding to the timing data is included in a time range where the vital data received by the data communication unit 337 is equal to or more than a present value, sets the time range as a tag range.

Further, the tagging device 100 according to this embodiment includes the sensor device 310 that measures and outputs vital data of a user to the data communication unit 337, the tag input device 320 that outputs timing data to the data communication unit 337, and the camera 202.

A tagging method according to this embodiment includes a data communication step of continuously receiving vital data of a user who records or plays back video data and also receiving timing data about tag input by the user, and a tag range processing step S612 and S613 of, when a time corresponding to the timing data is included in a time range where the vital data received in the data communication step is equal to or more than a present value, setting the time range as a tag range.

The level of importance of each scene in video data may be defined based on a tag assigned by the above-described tagging system. For example, the level of importance may be defined by a tag time range, a peak value of vital data, the integral of vital data with a tag time range or the like.

A program according to this embodiment causes a computer to execute a data communication procedure that continuously receives vital data of a user who records or plays back video data and also receives timing data about tag input by the user, and a procedure S612 and S613 that, when a time corresponding to the timing data is included in a time range where the vital data received in the data communication procedure is equal to or more than a present value, sets the time range of video data as a tag range.

Further, although two levels of importance, high and low, and three types of thinning-out rate, which are a thinning-out rate of a scene with a high level of importance, a thinning-out rate of a scene with a low level of importance, and a thinning-out rate of a scene where a tag is not assigned, are used in the above-described embodiment, the number of levels of importance may increase to three or four, and four or five types of thinning-out rate may be used accordingly.

Further, the data input/output unit 103, the tag data processor 104, the image data processor 204, the data input/output unit 206 and the recording time conversion processor 207 in the above-described embodiment may be implemented by hardware such as ASIC (Application Specific Integrated Circuit) or software. Further, a part of the processing may be implemented by software and the other part may be implemented by hardware. In the implementation by software, a computer system that includes one or a plurality of CPU (Central Processing Unit) such as a microprocessor executes a program related to processing of functional blocks. Such a program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, DVD-ROM (Digital Versatile Disc Read Only Memory), DVD-R (DVD Recordable)), DVD-R DL (DVD-R Dual Layer)), DVD-RW (DVD ReWritable)), DVD-RAM), DVD+R), DVR+R DL), DVD+RW), BD-R (Blu-ray (registered trademark) Disc Recordable)), BD-RE (Blu-ray (registered trademark) Disc Rewritable)), BD-ROM), and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A recording device comprising:
  an imaging unit implemented by integrated circuit that takes a video;
  a recording time conversion processor implemented by integrated circuit that converts a frame rate of specified video data in the video so as to adjust the video to fall within a specified recording time;
  a tag range processor implemented by integrated circuit that sets a tag range where a tag can be assigned in accordance with a level of importance to the video data; and
  a sensor device configured to sense one or more vital signs of a subject,
  wherein the level of importance to the video data is determined based at least in part on data of the one or more vital signs,
  wherein the recording time conversion processor converts a frame rate of a frame in a first video data range where the tag range is not set in the video data at a first thinning-out rate, and converts a frame rate of a frame in a second video data range where the tag range is set in the video data at a second thinning-out rate while the imaging unit takes a video, and further converts the frame rate of the video data after conversion for each scene so as to fall within a desired recording time, and
  wherein a tag is placed in the video data where the data of the one or more vital signs exceeds a specified threshold.

2. The recording device according to claim 1, wherein the first thinning-out rate is higher than the second thinning-out rate.

3. The recording device according to claim 1, wherein the second thinning-out rate in the second video data range with the highest level of importance is 1.

4. The recording device according to claim 1, wherein the recording time conversion processor converts a frame rate at a still lower thinning-out rate in the second video data range corresponding to the tag range where the tag with the higher level of importance is assigned.

5. A recording method in a recording device including an imaging unit that takes a video, a recording time conversion processor that converts a frame rate of specified video data in the video so as to adjust the video to fall within a specified recording time, and a tag range processor that sets a tag range where a tag can be assigned in accordance with a level of importance to the video data, the method comprising:
  converting a frame rate of a frame in a first video data range where the tag range is not set in the video data at a first thinning-out rate while the imaging unit takes a video;
  converting a frame rate of a frame in a second video data range where the tag range is set in the video data at a second thinning-out rate while the imaging unit takes a video;
  converting the frame rate of the video data after conversion for each scene so as to fall within a desired recording time;
  sensing one or more vital signs of a subject, and
  determining the level of importance to the video data based at least in part on data of the one or more vital signs,
  wherein a tag is placed in the video data where the data of the one or more vital signs exceeds a specified threshold.

6. A non-transitory recording medium storing a recording program causing a computer to execute, in a recording device including an imaging unit that takes a video, a recording time conversion processor that converts a frame rate of specified video data in the video so as to adjust the video to fall within a specified recording time, and a tag range processor that sets a tag range where a tag can be assigned in accordance with a level of importance to the video data:
  converting a frame rate of a frame in a first video data range where the tag range is not set in the video data at a first thinning-out rate;
  converting a frame rate of a frame in a second video data range where the tag range is set in the video data at a second thinning-out rate while the imaging unit takes a video;
  converting the frame rate of the video data after conversion for each scene so as to fall within a desired recording time;
  sensing one or more vital signs of a subject, and
  determining the level of importance to the video data based at least in part on data of the one or more vital signs,
  wherein a tag is placed in the video data where the data of the one or more vital signs exceeds a specified threshold.

* * * * *